(12) United States Patent
Ahn et al.

(10) Patent No.: US 7,705,947 B2
(45) Date of Patent: Apr. 27, 2010

(54) METHOD OF FABRICATING AN LCD WITH SECOND MASK PROCESS FOR MAKING COMMON ELECTRODE AT A PORTION CONSIST OF ONE CONDUCTIVE LAYER, AND WITH PIXEL ELECTRODE HAVING A SINGLE LAYER STRUCTURE

(75) Inventors: Byung Chul Ahn, Anyang-shi (KR); Joo Soo Lim, Gumi-si (KR); Byung Ho Park, Pohang-si (KR)

(73) Assignee: LG Display Co., Ltd., Seoul (KR)

( * ) Notice: Subject to any disclaimer, the term of this patent is extended or adjusted under 35 U.S.C. 154(b) by 1108 days.

(21) Appl. No.: 11/311,218

(22) Filed: Dec. 20, 2005

(65) Prior Publication Data

US 2006/0139547 A1 Jun. 29, 2006

(30) Foreign Application Priority Data

Dec. 24, 2004 (KR) ............... 10-2004-0112583

(51) Int. Cl.
    *G02F 1/1343* (2006.01)
(52) U.S. Cl. ............... 349/141; 349/39; 349/147; 349/187
(58) Field of Classification Search ............... 349/141, 349/147, 148
    See application file for complete search history.

(56) References Cited

U.S. PATENT DOCUMENTS

| 6,177,970 | B1 * | 1/2001 | Kim ............... 349/43 |
| 6,721,026 | B2 * | 4/2004 | Cheng et al. ............... 349/141 |
| 2002/0085157 | A1 * | 7/2002 | Tanaka et al. ............... 349/147 |
| 2003/0007108 | A1 * | 1/2003 | Hwang et al. ............... 349/43 |
| 2006/0139502 | A1 * | 6/2006 | Ahn et al. ............... 349/38 |
| 2006/0139548 | A1 * | 6/2006 | Ahn ............... 349/141 |
| 2006/0139549 | A1 * | 6/2006 | Ahn et al. ............... 349/141 |
| 2006/0146256 | A1 * | 7/2006 | Ahn ............... 349/141 |

* cited by examiner

*Primary Examiner*—Andrew Schechter
(74) *Attorney, Agent, or Firm*—McKenna Long & Aldridge LLP

(57) ABSTRACT

A liquid crystal display device having a simplified manufacturing process is disclosed. The liquid crystal display device includes a gate line and a common line having a first conductive layer group having at least double conductive layers. A common electrode is formed by an extension of at least one transparent conductive layer of a common line. A portion of the common electrode is formed of one conductive layer of the first conductive layer group, while a remaining portion of the common electrode is formed of the first conductive layer group. The gate line, a source electrode and a drain electrode have a second conductive layer group having at least double conductive layers, and the pixel electrode is formed by an extension of at least one transparent conductive layer of the drain electrode.

16 Claims, 25 Drawing Sheets

FIG. 7B
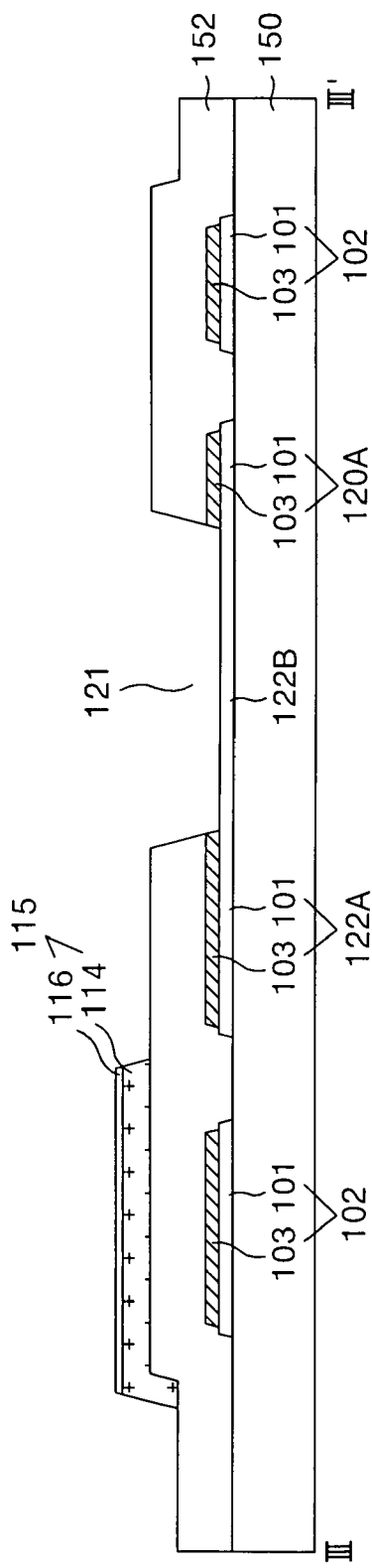
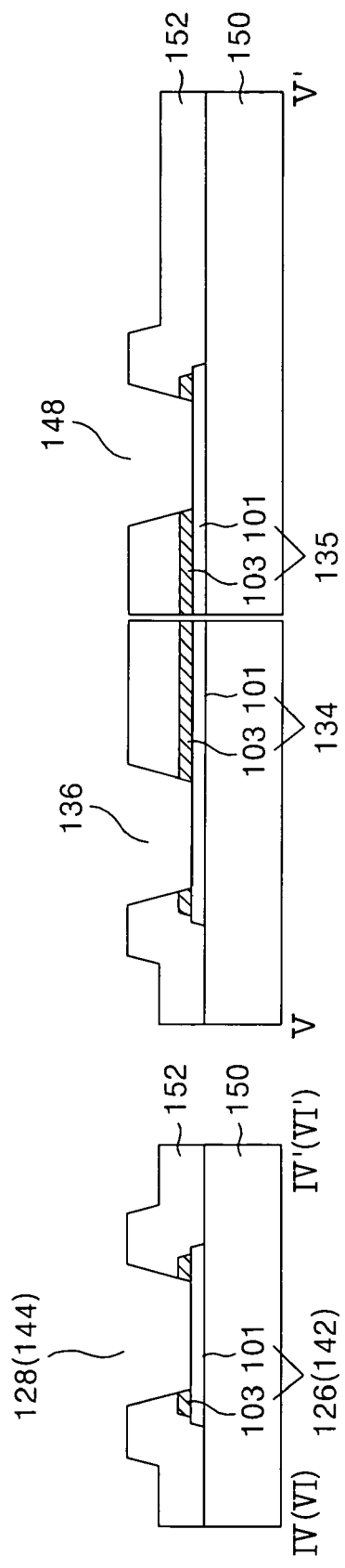

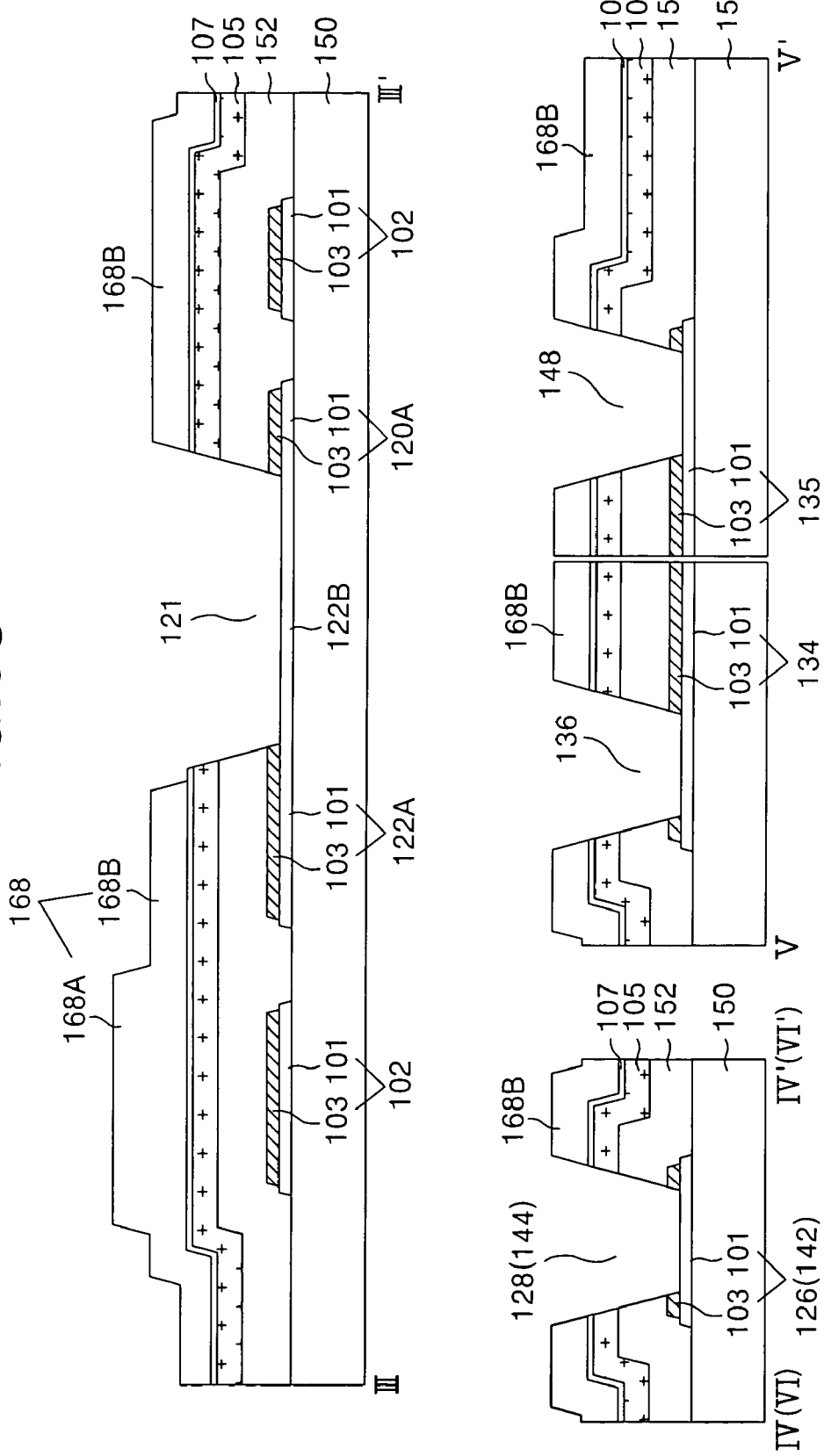

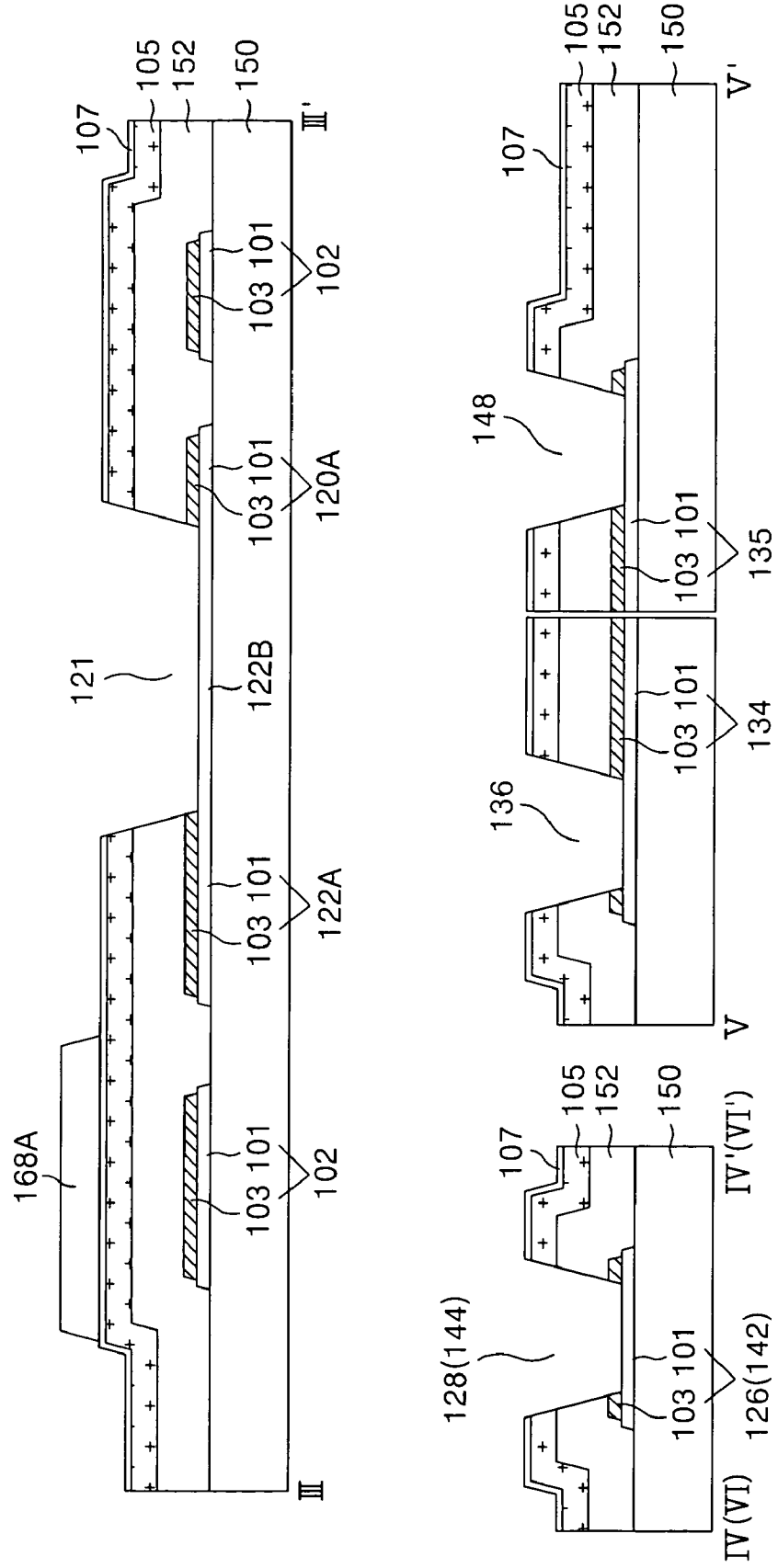

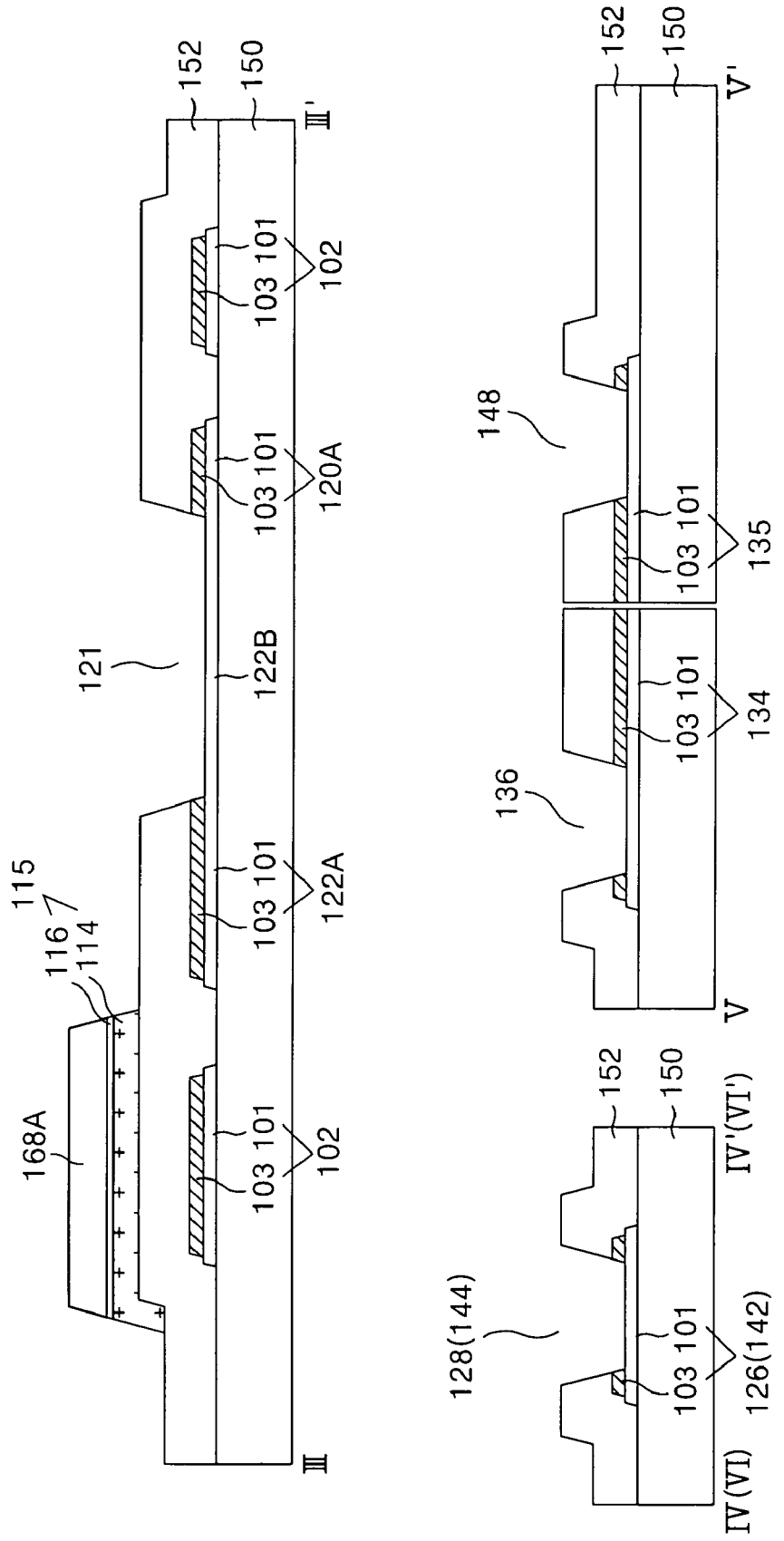

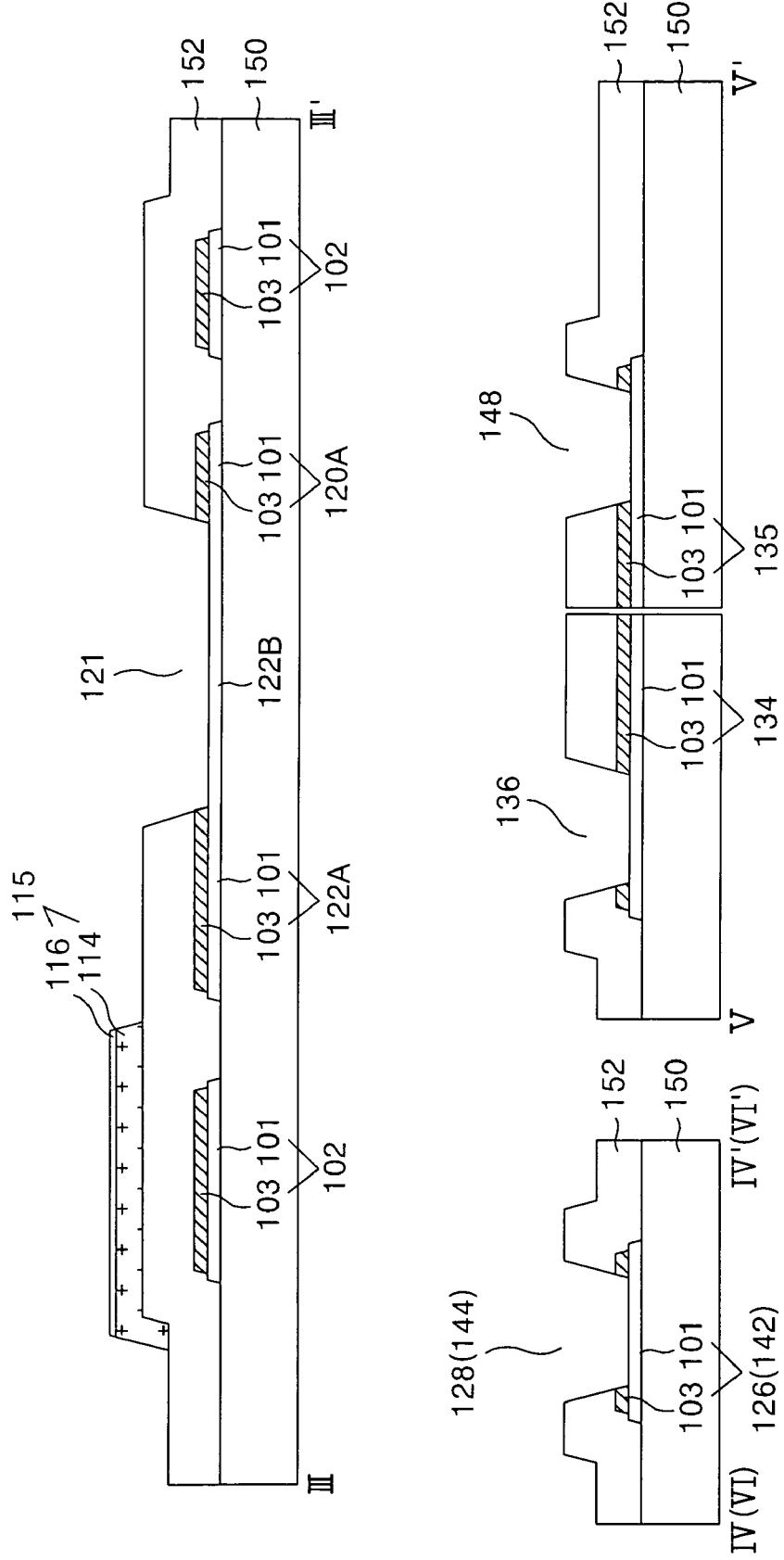

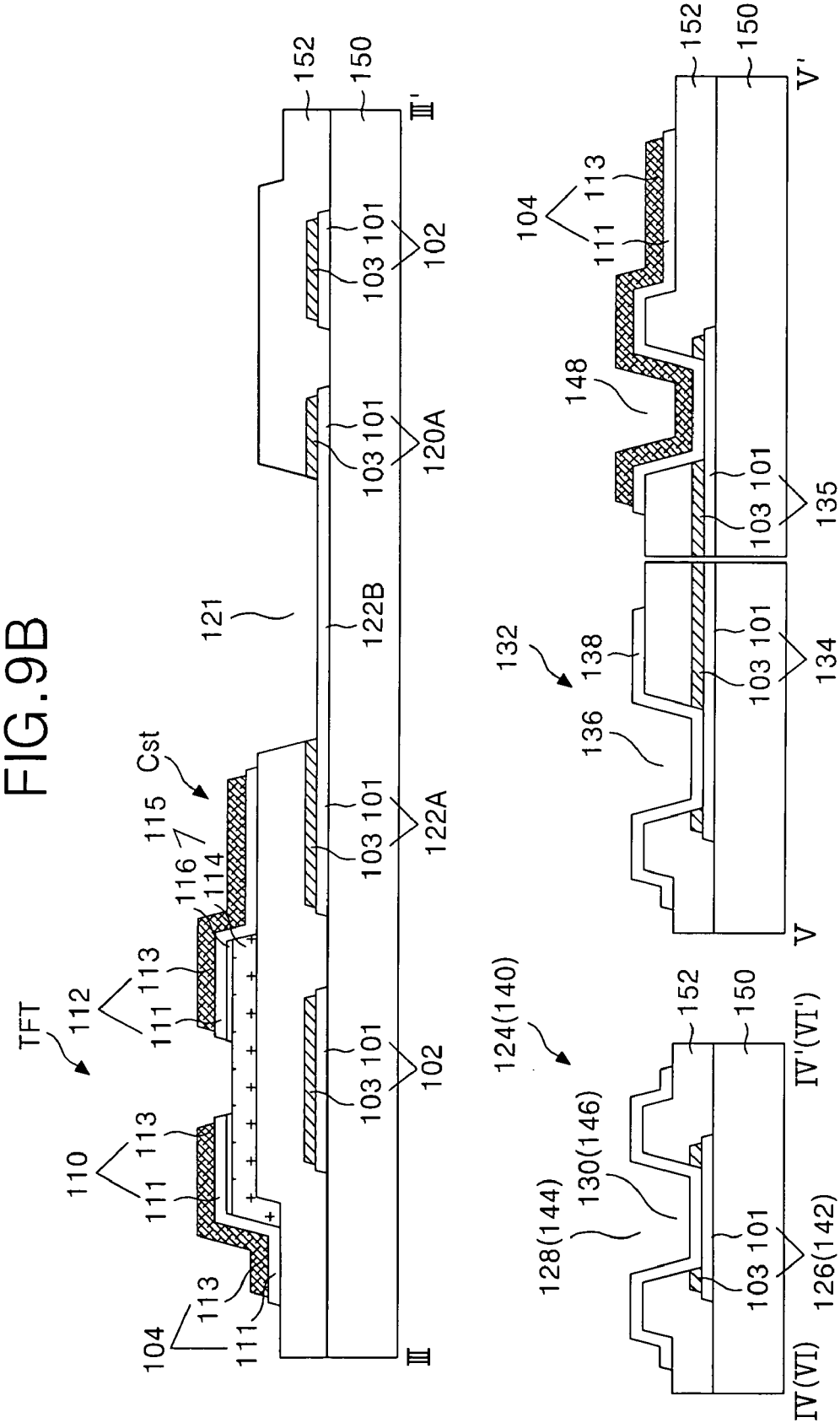

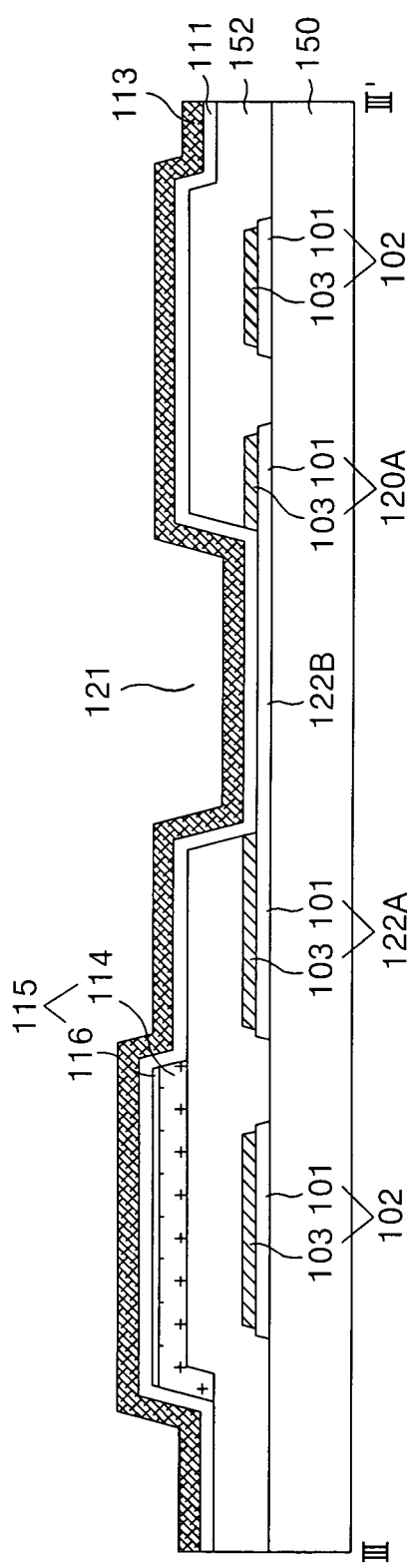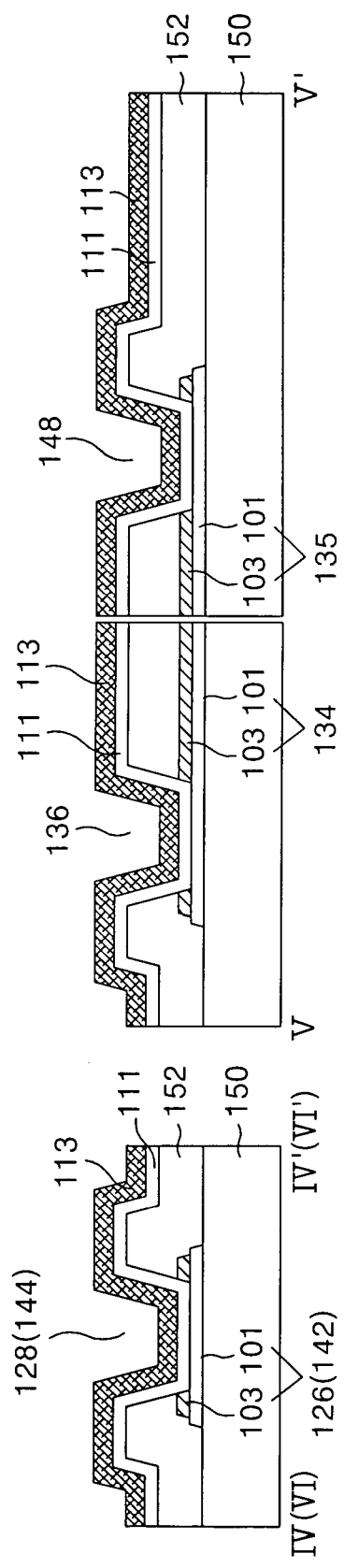
FIG.10A

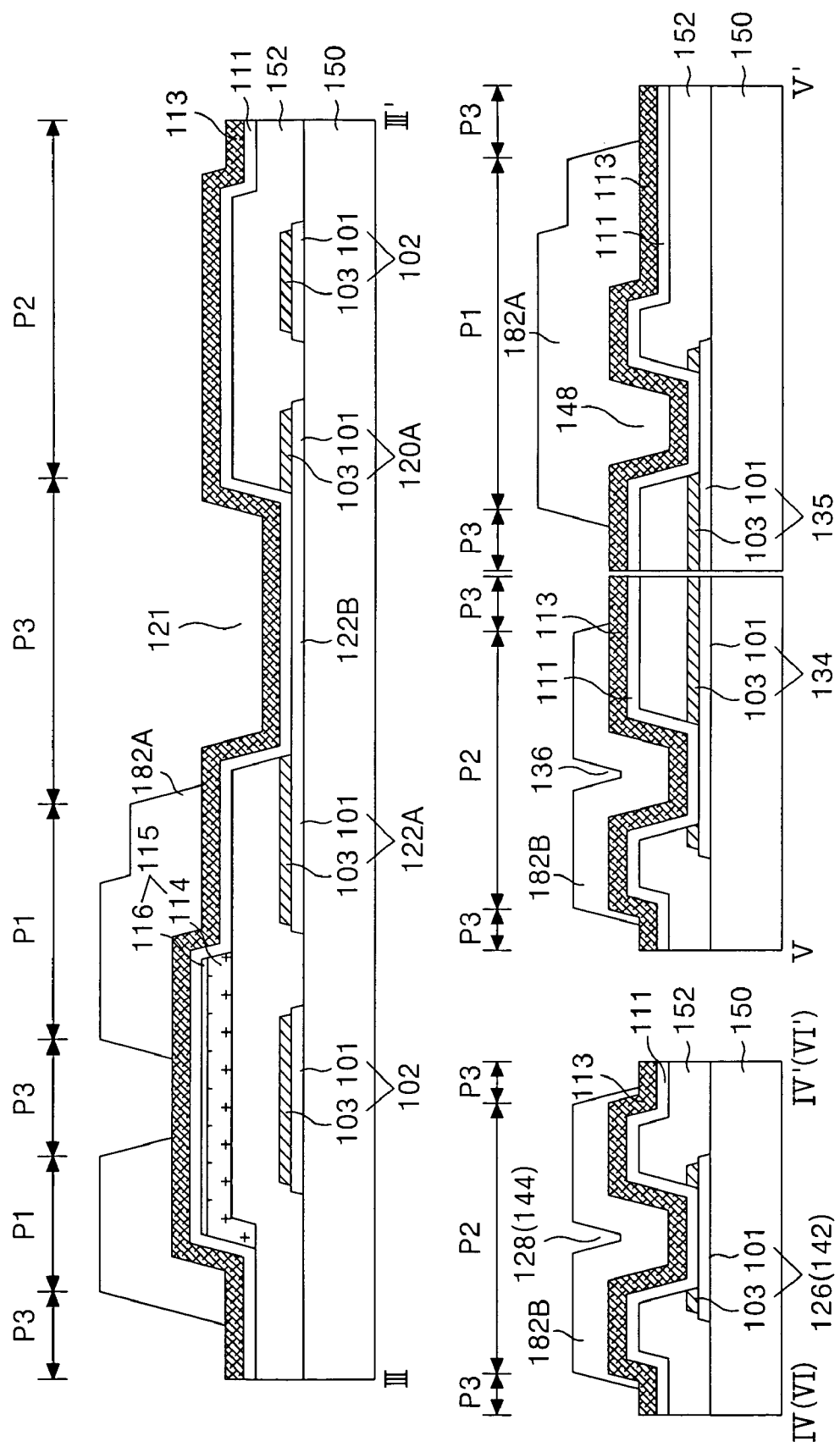

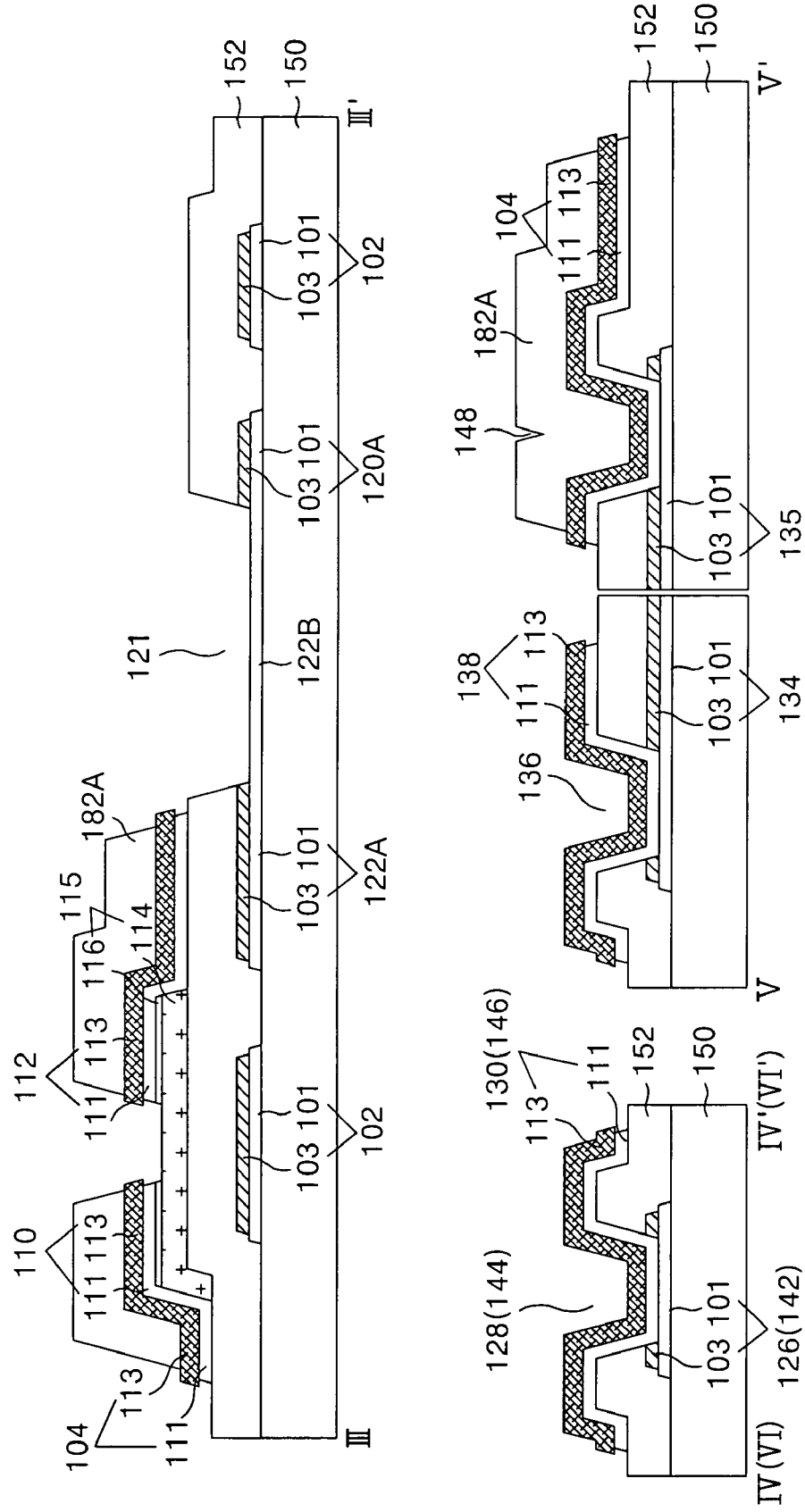

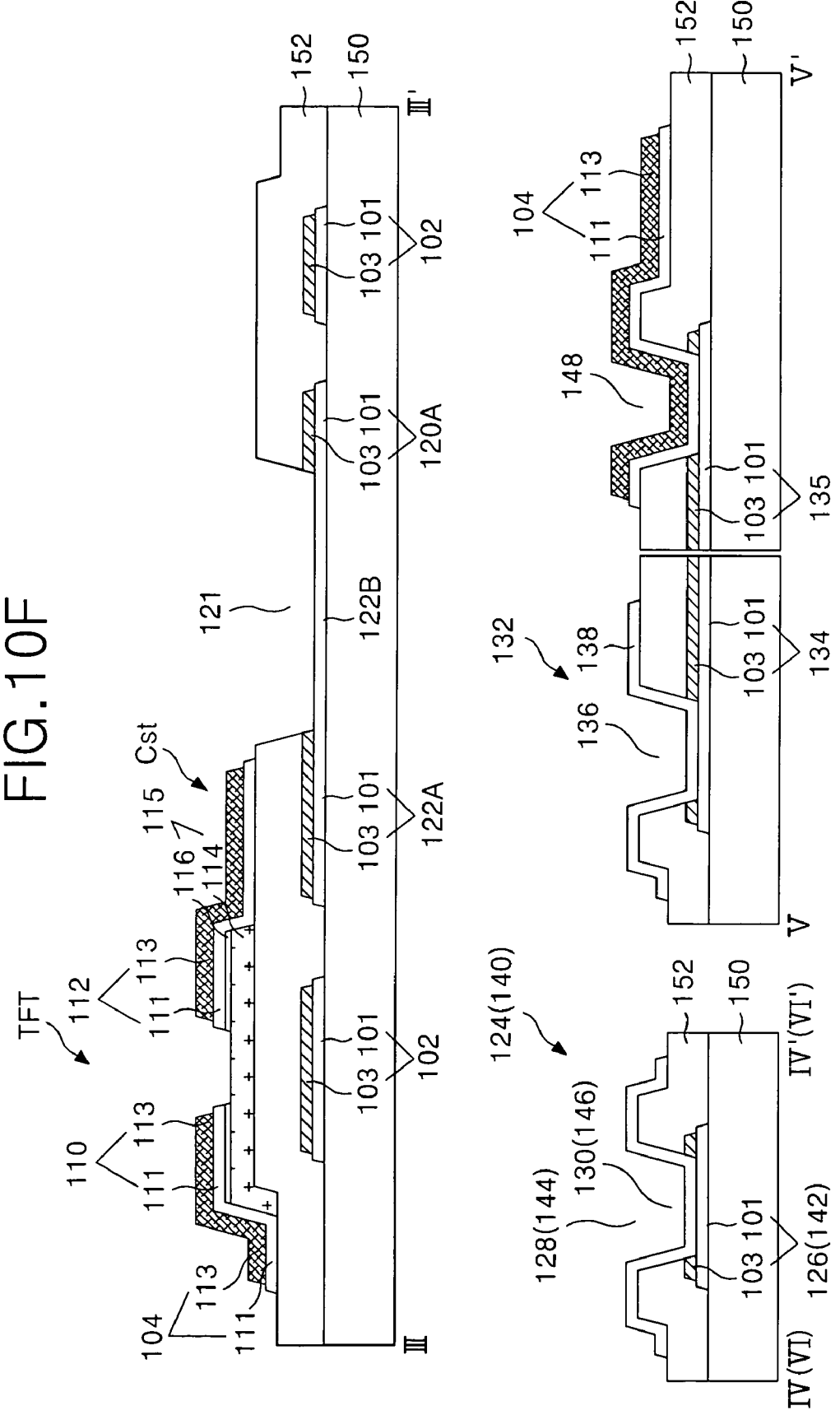

METHOD OF FABRICATING AN LCD WITH SECOND MASK PROCESS FOR MAKING COMMON ELECTRODE AT A PORTION CONSIST OF ONE CONDUCTIVE LAYER, AND WITH PIXEL ELECTRODE HAVING A SINGLE LAYER STRUCTURE

This application claims the benefit of Korean Patent Application No. P2004-112583 filed in Korea on Dec. 24, 2004, which is hereby incorporated by reference for all purposes as if fully set forth herein.

BACKGROUND OF THE INVENTION

1. Field of the Invention

This invention relates to a liquid crystal display device using a horizontal electric field, and more particularly to a thin film transistor substrate of a horizontal electric field applying type and a fabricating method thereof that are adaptive for simplifying a process.

2. Description of the Related Art

Generally, a liquid crystal display device controls light transmittance of a liquid crystal having a dielectric anisotropy using an electric field to display a picture. To this end, a liquid crystal display device includes a liquid crystal display panel (hereinafter, a liquid crystal panel) for displaying a picture by a liquid crystal cell matrix, and a driving circuit for driving the liquid crystal display panel.

Referring to FIG. 1, a related art liquid crystal display panel is comprised of a color filter substrate 10 and a thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell area divided by the black matrix 4 in such a manner to be divided into red(R), green(G) and blue(B) ones, thereby transmitting red, green and blue lights. The common electrode 8 is formed of a transparent conductive layer coated entirely on the color filter 6, and supplies a common voltage Vcom that serves as a reference voltage upon driving of liquid crystal 24. Further, an over-coated layer (not shown) for smoothing the color filter 6 may be provided between the color filter 6 and the common electrode 8.

The thin film transistor substrate 20 includes a thin film transistor 18 and a pixel electrode 22 provided for each cell area defined by a crossing between a gate line 14 and a data line 16 at a lower glass substrate 12. The thin film transistor 18 applies a data signal from the data line 16 to the pixel electrode 22 in response to a gate signal from the gate line 14. The pixel electrode 22 formed from a transparent conductive layer supplies a data signal from the thin film transistor 18 to drive the liquid crystal 24.

The liquid crystal 24 having a dielectric anisotropy is rotated in accordance with an electric field formed by a data signal from the pixel electrode 22 and a common voltage Vcom from the common electrode 8 to control light transmittance, thereby implementing a gray scale level.

Further, a liquid crystal display panel includes a spacer (not shown) for maintaining a cell gap between the color filter substrate 10 and the thin film transistor substrate 20.

In such the liquid crystal display panel, the color filter substrate 10 and the thin film transistor substrate 20 are formed by a plurality of mask processes. Herein, one mask process includes many processes such as thin film deposition (coating), cleaning, photolithography (hereinafter, photo process), etching, photo-resist stripping and inspection processes, etc.

Particularly, since the thin film transistor substrate includes the semiconductor process and requires a plurality of mask processes, it has a complicated fabricating process that acts as a major factor in the manufacturing cost rise of the liquid crystal display panel. Therefore, the thin film transistor substrate has been developed toward a reduction in the number of mask process.

Liquid crystal displays are largely classified into a vertical electric field applying type and a horizontal electric field applying type depending upon a direction of the electric field driving the liquid crystal.

The liquid crystal display of a vertical electric field applying type drives a liquid crystal in a twisted nematic (TN) mode with a vertical electric field formed between a pixel electrode and a common electrode arranged opposite to each other on the upper and lower substrates. The liquid crystal display of a vertical electric field applying type has an advantage of a large aperture ratio, while having a drawback of a narrow viewing angle of about 90°.

The liquid crystal display device of a horizontal electric field applying type drives a liquid crystal in an in plane switching (IPS) mode with a horizontal electric field between the pixel electrode and the common electrode arranged in parallel to each other on the lower substrate. The liquid crystal display device of a horizontal electric field applying type has an advantage of a wide viewing angle of about 160°.

The thin film transistor substrate in the liquid crystal display device of horizontal electric field applying type also requires a plurality of mask processes which is a drawback and complicates the fabricating process and increases costs. Therefore, in order to reduce the manufacturing cost, it is necessary to reduce the number of mask processes.

SUMMARY OF THE INVENTION

Accordingly, the present invention is directed to a liquid crystal display device and fabricating method thereof that substantially obviates one or more of the problems due to limitations and disadvantages of the related art.

An advantage of the present invention is to provide a liquid crystal display device of a horizontal electric field applying type and a fabricating method thereof that are adaptive for simplifying a process.

To achieve these and other advantages of the invention, the liquid crystal display device according to one aspect of the present invention comprises a gate line provided on a substrate; a data line crossing the gate line with a gate insulating film therebetween to define a pixel area; a thin film transistor including a gate electrode connected to the gate line, a source electrode connected to the data line, a drain electrode opposed to the source electrode and a semiconductor pattern defining a channel between the source electrode and the drain electrode; a common line provided in parallel to the gate line on the substrate; a common electrode extended from the common line and provided in the pixel area; and a pixel electrode extended from the drain electrode into the pixel area, wherein a horizontal electric field is formed between the pixel electrode and the common electrode, wherein the gate line and the common line are formed of a first conductive layer group having at least double conductive layers, wherein a portion of the common electrode is formed of one conductive layer of the first conductive layer group and an another portion of the common electrode is formed of multiple layers of the first conductive layer group, and wherein the gate line, the source electrode, the drain electrode have a second conductive layer group having at least double conductive layers are built, and the pixel electrode is formed by an extension of at least one transparent conductive layer of the drain electrode.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended claims.

In another aspect of the present invention, a method of fabricating a liquid crystal display device comprises a first mask process of forming a first mask pattern group including a gate line have a first conductive layer group having at least double conductive layers, a gate electrode connected to the gate line, a common line parallel to the gate line, a common electrode extended from the common line on a substrate; a second mask process of forming a gate insulating film covering the first mask pattern group, forming a semiconductor pattern on the gate insulating film, and exposing a portion of the common electrode of one conductive layer of the first conductive layer group; a third mask process of forming a third mask pattern group including a data line, a source electrode connected to the data line and a drain electrode opposite the source electrode that have a second conductive layer group structure having at least double conductive layers, and a pixel electrode formed by an extension of a lowermost layer of the drain electrode having a single layer structure, on the gate insulating film provided with the semiconductor pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7a and FIG. 7b are a plan view and a sectional view for explaining a second mask process in a method of fabricating the thin film transistor substrate of horizontal electric field applying type according to an embodiment of the present invention, respectively;

FIG. 8a to FIG. 8f are sectional views more specifically explaining the second mask process;

FIG. 9a and FIG. 9b are a plan view and a sectional view for explaining a third mask process in a method of fabricating the thin film transistor substrate of horizontal electric field applying type according to an embodiment of the present invention, respectively;

FIG. 10a to FIG. 10f are sectional views more specifically explaining the third mask process;

DETAILED DESCRIPTION OF THE ILLUSTRATED EMBODIMENTS

Reference will now be made in detail to embodiments of the present invention, examples of which are illustrated in the accompanying drawings.

Figure 1:
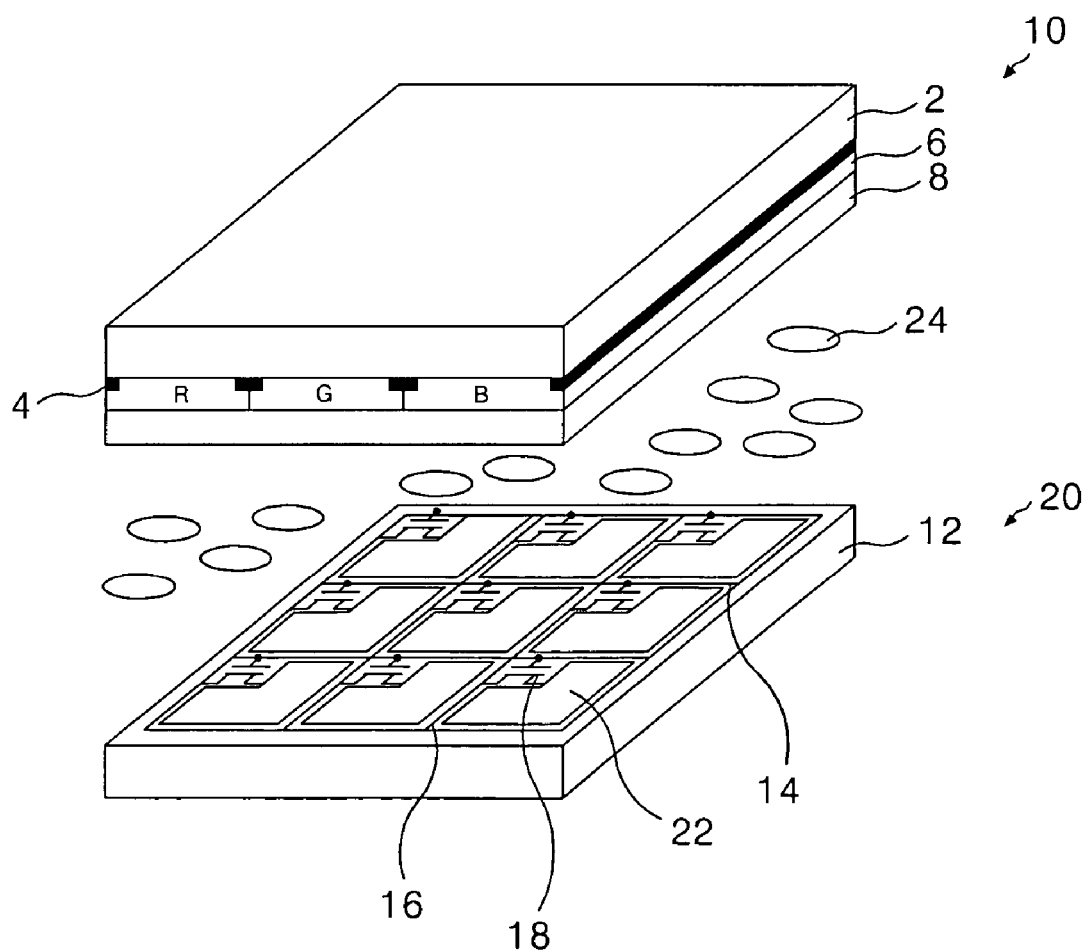
FIG. 1 is a schematic perspective view showing a structure of a related art liquid crystal display panel.
Figure 2:
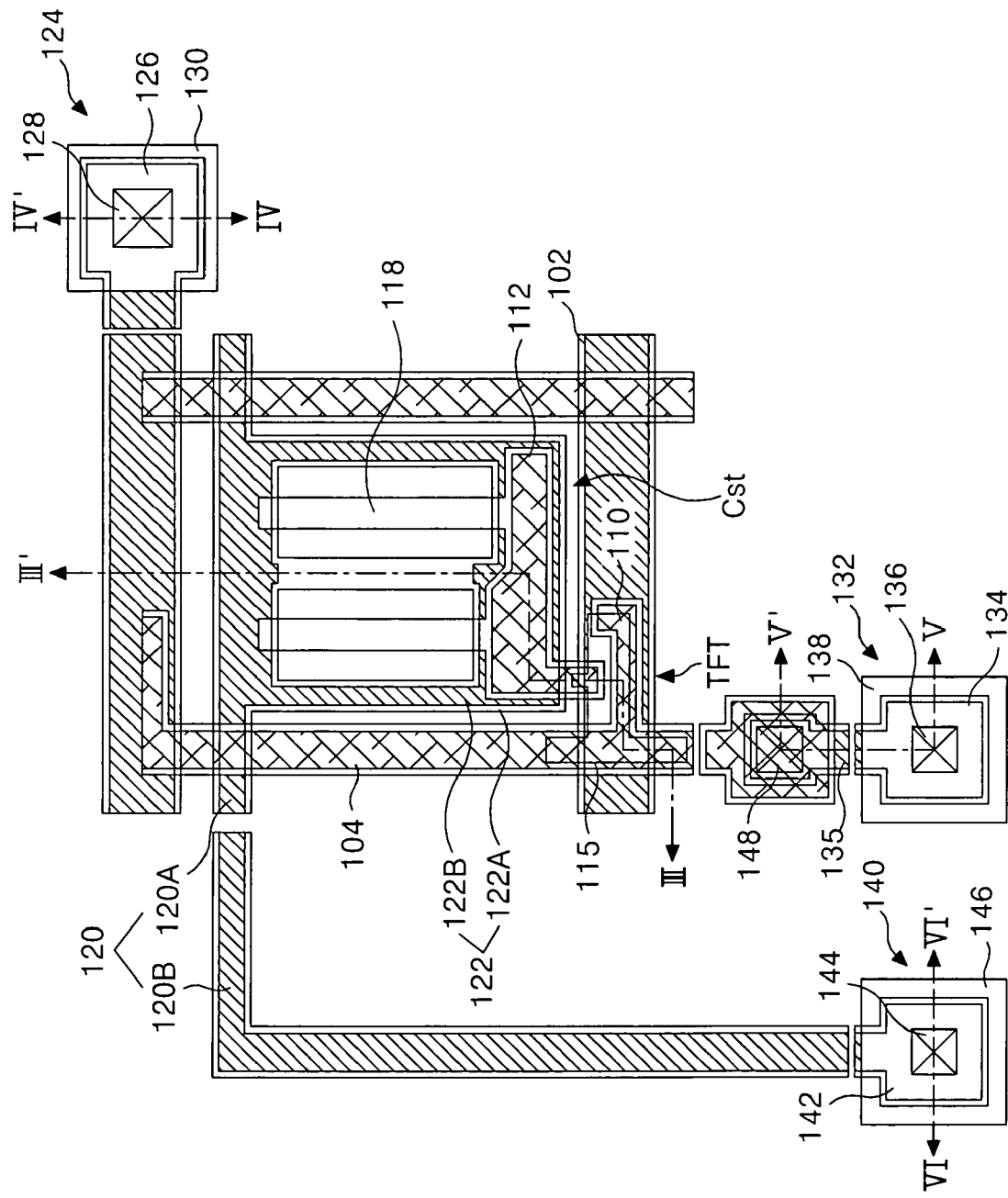
FIG. 2 is a plan view showing a portion of a thin film transistor substrate of horizontal electric field applying type according to an embodiment of the present invention.
Figure 3:
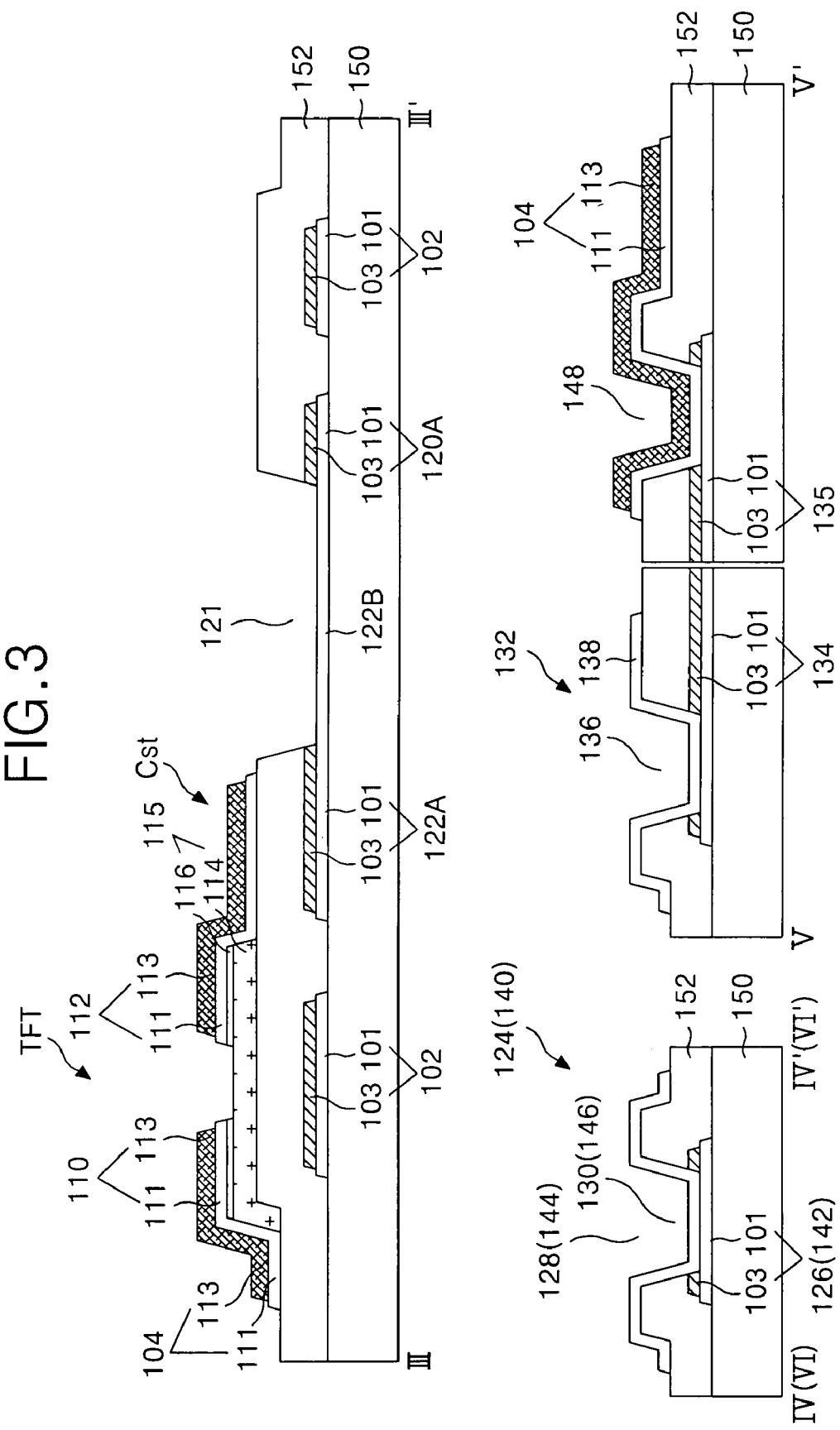
FIG. 3 is a sectional view of the thin film transistor substrate of horizontal electric field applying type taken along the III-III', IV-IV', V-V' and VI-VI' lines in FIG. 2.

FIG. 2 is a plan view showing a structure of a thin film transistor substrate of a horizontal electric field applying type according to an embodiment of the present invention, and FIG. 3 is a sectional view of the thin film transistor substrate taken along the III-III', IV-IV', V-V' and VI-VI' lines in FIG. 2.

Referring to FIG. 2 and FIG. 3, the thin film transistor substrate of horizontal electric field applying type includes a gate line 102 and a data line 104 provided on a lower substrate 150 in such a manner as to cross each other with a gate insulating film 152 therebetween and define a pixel area, a thin film transistor TFT connected to the gate line 102, the data line 104, and a pixel electrode 118, the pixel electrode 118 and a common electrode 122 form a horizontal electric field in the pixel area, a common line 120 connected to the common electrode 122, and a storage capacitor Cst provided at an overlapping portion between the common electrode 122 and a drain electrode 112. Further, the thin film transistor substrate includes a gate pad 124 connected to the gate line 102, and a data pad 132 connected to the data line 104, and a common pad 140 connected to the common line 120.

The gate line 102 supplies a scanning signal from a gate driver (not shown), while the data line 104 supplies a video signal from a data driver (not shown). The gate line 102 and the data line 104 cross each other with the gate insulating film 152 therebetween to define the pixel area.

The gate line 102 is formed on the substrate 150 in a multiple-layer structure having at least double gate metal layers. For instance, as shown FIG. 3, the gate line 102 has a double-layer structure in which a first conductive layer 101 employing a transparent conductive layer and a second conductive layer 103 of an opaque metal are formed. The data line 104 is formed on the gate insulating film 152 in a multiple-layer structure having at least double gate metal layers. For instance, as shown FIG. 3, the data line 104 has a double-layer structure in which a third conductive layer 111 employing a transparent conductive layer and a fourth conductive layer 113 of an opaque metal are formed. The first and third conductive layers 101 and 111 are formed of, for example, ITO, TO, IZO or ITZO. The second and fourth conductive layers 103 and 113 employ a single layer or a multiple-layer structure formed of a metal material such as Mo, Ti, Cu, AlNd, Al, Cr, a Mo-alloy, a Cu-alloy and a Al-alloy.

The thin film transistor TFT allows a video signal applied to the data line 104 to be charged to the pixel electrode 118 and be maintained in response to a scanning signal applied to the gate line 102. To this end, the thin film transistor TFT includes a gate electrode extended from the gate line 102, a source electrode 110 connected to the data line 104, a drain electrode 112 positioned opposite to the source electrode 110 to be connected to the pixel electrode 118, a semiconductor pattern 115 overlapping with the gate line 102 with the gate insulating film 152 therebetween to provide a channel between the source electrode 110 and the drain electrode 112. Herein, the source electrode 110 and the drain electrode 112, along with the data line 104, have a double-layer structure in which the third conductive layer and fourth conductive layer 111 and 113 are formed. The semiconductor pattern 115 includes an active layer 114 defining a channel between the source electrode 110 and the drain electrode 112, and an ohmic contact layer 116 formed on the active layer 114 other than the channel portion to make an ohmic contact with the source electrode 110 and the drain electrode 112.

The common line 120 and the common electrode 122 supply a reference voltage for driving the liquid crystal, that is, a common voltage to each pixel.

To this end, the common line 120 includes an internal common line 120A provided substantially parallel to the gate line 102 at a display area, and an external common line 120B commonly connected to the internal common line 120A at an non-display area. The common line 120 has a double-layer structure in which the first conductive layer and second conductive layer 101 and 103 are built on the substrate 150 along with the gate line 102.

The common electrode 122 is provided within the pixel area and connected to the internal common line 120A. More specifically, the common electrode 122 includes a horizontal part 122A overlapping with the drain electrode 112 adjacently with the gate line 102, and a finger part 122B extended from the horizontal part 122A into the pixel area and connected to the internal common line 120A. The horizontal part 122A of the common electrode 122 and the finger part 122B other than a middle finger have a double-layer structure in which the first and second conductive layers 101 and 103 are built like the common line 120. The middle finger of the finger part 122B is formed only of the first conductive layer 101 of the common line 120. That is, a transparent conductive layer to improve an aperture ratio, and is exposed through a transmitting hole 121 passing through the gate insulating film 152.

The storage capacitor Cst is provided such that the first horizontal part 122A of the common electrode 122 overlaps with the drain electrode 112 with the gate insulating film 152 therebetween. Herein, the drain electrode 112 is extended from the overlapping portion between it and the thin film transistor TFT, that is, the gate line 102 in such a manner to overlap with the first horizontal part 122A of the common electrode 122 as widely as possible. Thus, a capacitance value of the storage capacitor Cst is increased by the wide overlapping area between the common electrode 122 and the drain electrode 112, so that the storage capacitor Cst allows a video signal charged in the pixel electrode 118 to be stably maintained until the next signal is charged.

The pixel electrode 118 is extended from the drain electrode 112 in such a manner to have a finger shape parallel to the finger part 122B of the common electrode 122. The edge of the pixel electrode 118 is overlapped with the internal common line 120A. Particularly, the pixel electrode 118 is formed of the third conductive layer 111 extended from the drain electrode 112, that is, a transparent conductive layer. If a video signal is applied, via the thin film transistor, to the pixel electrode 118, then a horizontal electric field is formed between the pixel electrode 118 and the finger part 122B of the common electrode 122 supplied with the common voltage. Liquid crystal molecules arranged in the horizontal direction between the thin film transistor array substrate and the color filter array substrate by such a horizontal electric field are rotated due to a dielectric anisotropy. Transmittance of a light through the pixel area is differentiated depending upon a rotation extent of the liquid crystal molecules, thereby implementing a gray level scale.

Figure 4:
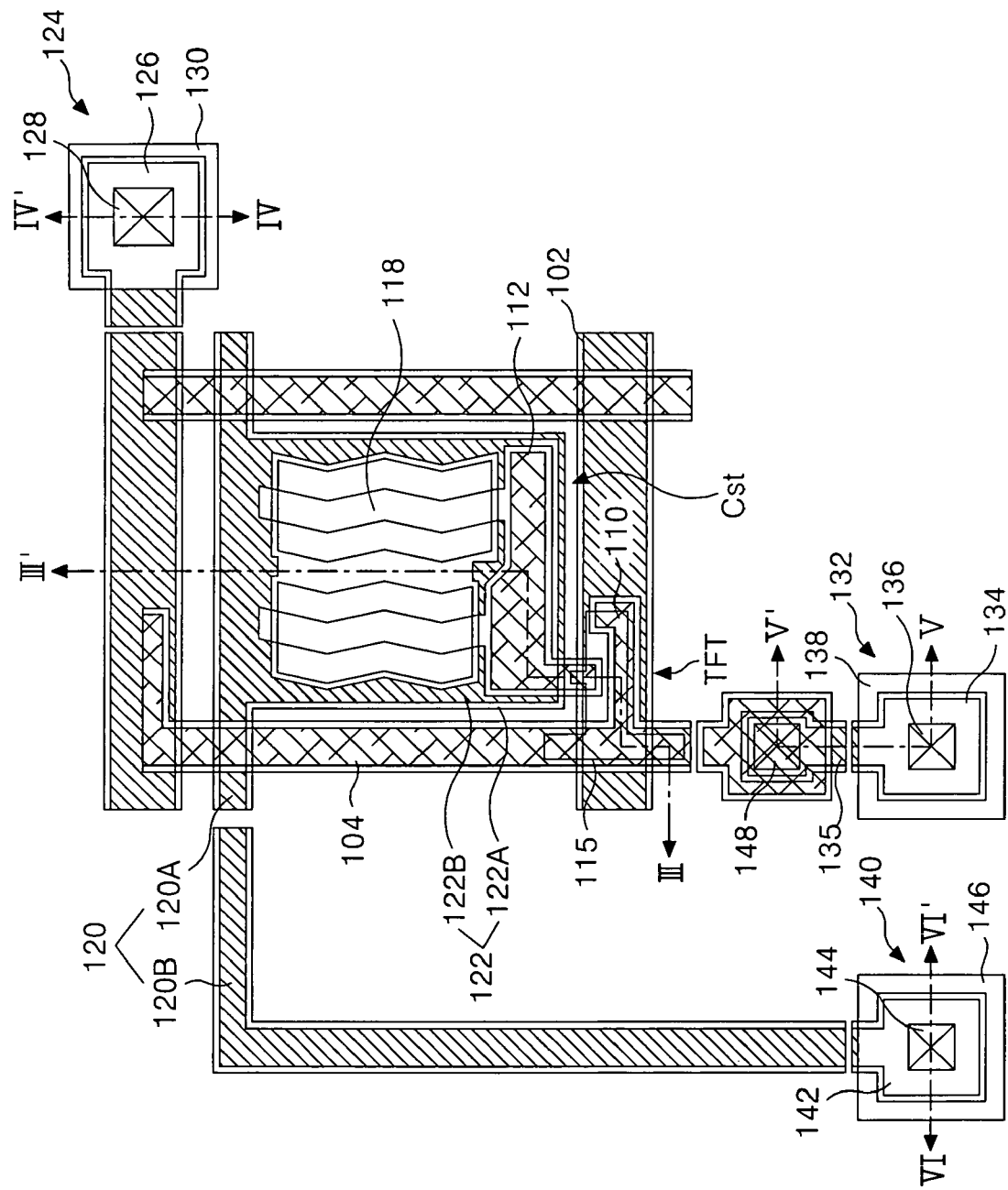
FIG. 4 is a plan view showing a portion of a thin film transistor substrate of horizontal electric field applying type according to the another embodiment of the present invention.

Further, as shown FIG. 4, the finger part 122B of the common electrode 122 and the pixel electrode 118 can be formed in a zigzag manner. In this case, the edge adjacent to the data line 104 in the finger part 122B of the common electrode 122 is formed in such a manner to be parallel to the data line 104 or in a zigzag manner. Also, the data line 104 may be formed in a zigzag manner along with the finger part 122B of the adjacent common electrode 122.

The gate line 102 is connected, via the gate pad 124, to the gate driver (not shown). The gate pad 124 consists of a lower gate pad electrode 126 extended from the gate line 102, and an upper gate pad electrode 130 connected, via a first contact hole 128 passing through the gate insulating film 152, to the lower gate pad electrode 126.

The data line 104 is connected, via the data pad 132, to a data driver (not shown). The data pad 132 consists of a lower data pad electrode 134 connected to a data link 135, and an upper data pad electrode 138 connected, via a second contact hole 136 passing through the gate insulating film 152, to the lower data pad electrode 134.

The common line 120 receives a reference voltage from a common voltage source (not shown) via the common pad 140. The common pad 140 includes a lower common pad electrode 142 extended from the external common line 120B, and an upper common pad electrode 146 provided within a third contact hole 144 passing through the gate insulating film 152 to be connected to the lower common pad electrode 142.

In such a thin film transistor substrate according to the embodiment of the present invention, the data pad 132 has the same structure as the gate pad 124 and the common pad 140. More specifically, the lower gate pad electrode 126, the lower common pad electrode 142, the lower data pad electrode 134 and the data link 135 are formed on the substrate 150 in a double-layer structure in which the first conductive layer and second conductive layers 101 and 103 are built like the gate line 102. Also, the upper gate pad electrode 130, the upper common pad electrode 146, the upper data pad electrode 138 and the data line 104 are formed on the gate insulating film 152, and are formed of the third conductive layer 111 in which the fourth conductive layer 113 is removed, that is, a transparent conductive layer.

Accordingly, the data link 135 formed on the substrate 150 is connected, via a fourth contact hole 148 passing through the gate insulating film, to the data line 104. The data link 135 is extended from the lower data pad electrode 134 to thereby have a structure in which the first and second conductive layers 101 and 103 are built. The second conductive layer 103 of the data link 135 exposed through the fourth contact hole 148 to be connected to the third conductive layer 111 of the data line 104. In this case, the third conductive layer 111 of the data line 104 may have a structure that is extended along the data link 135 in such a manner to be integral to the upper data pad electrode 138. The data line 104 is exposed due to an absence of the protective film. In order to prevent the fourth conductive layer 113 of the data line 104 from being exposed to the exterior thereof and oxidized, as shown FIG. 5, the fourth contact hole 148 is positioned within an area sealed by a sealant 200. Thus, the fourth conductive layer 113 of the data line 104 positioned at the sealed area is protected by a lower alignment film 214 to be coated thereon.

Figure 5:
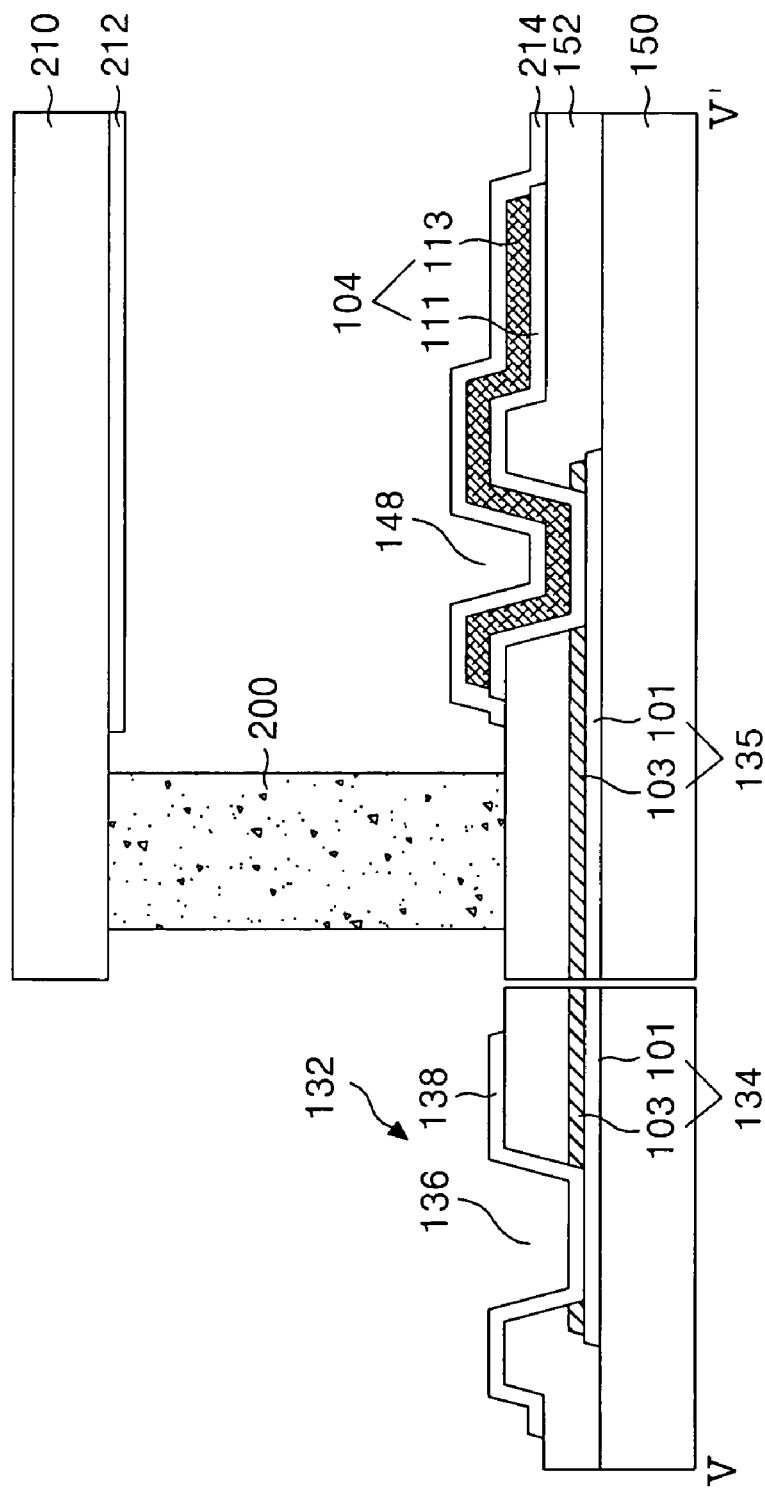
FIG. 5 is a sectional view showing a data pad area of a liquid crystal display panel employing the thin film transistor substrate of horizontal electric field applying type shown in FIG. 3.

Referring to FIG. 5, the thin film transistor substrate formed with a lower alignment film 214 and the color filter substrate 210 coated with an upper alignment film 212 are joined to each other by the sealant 200, and a cell gap between two substrates sealed by the sealant 200 is filled with a liquid crystal. In this case, the liquid crystal may be formed by a liquid crystal dropping method in which a liquid crystal layer is formed by dropping the liquid crystal onto at least one substrate and then joining the substrates, or a vacuum injection method in which two substrates are joined and then the liquid crystal is injected. The upper and lower alignment films 212 and 214 are formed with an organic insulating material at each picture display area of the two substrates. The sealant 200 is formed with a space in a manner to not be in contact with the upper and lower alignment films 212 and 214 for the purpose of reinforcing an adhesive force. Thus, the data line 104, the source electrode 110, the drain electrode 112, and the pixel electrode 118 provided on the thin film transistor substrate are positioned at an area sealed by the sealant 200, so that it may be sufficiently protected by the lower alignment film 214 formed thereon as well as by the liquid crystal filled in the sealed area.

The thin film transistor substrate of horizontal electric field applying type according to the first embodiment of the present invention having no protective film as described above is formed by the following three-round mask process.

Figure 6A:
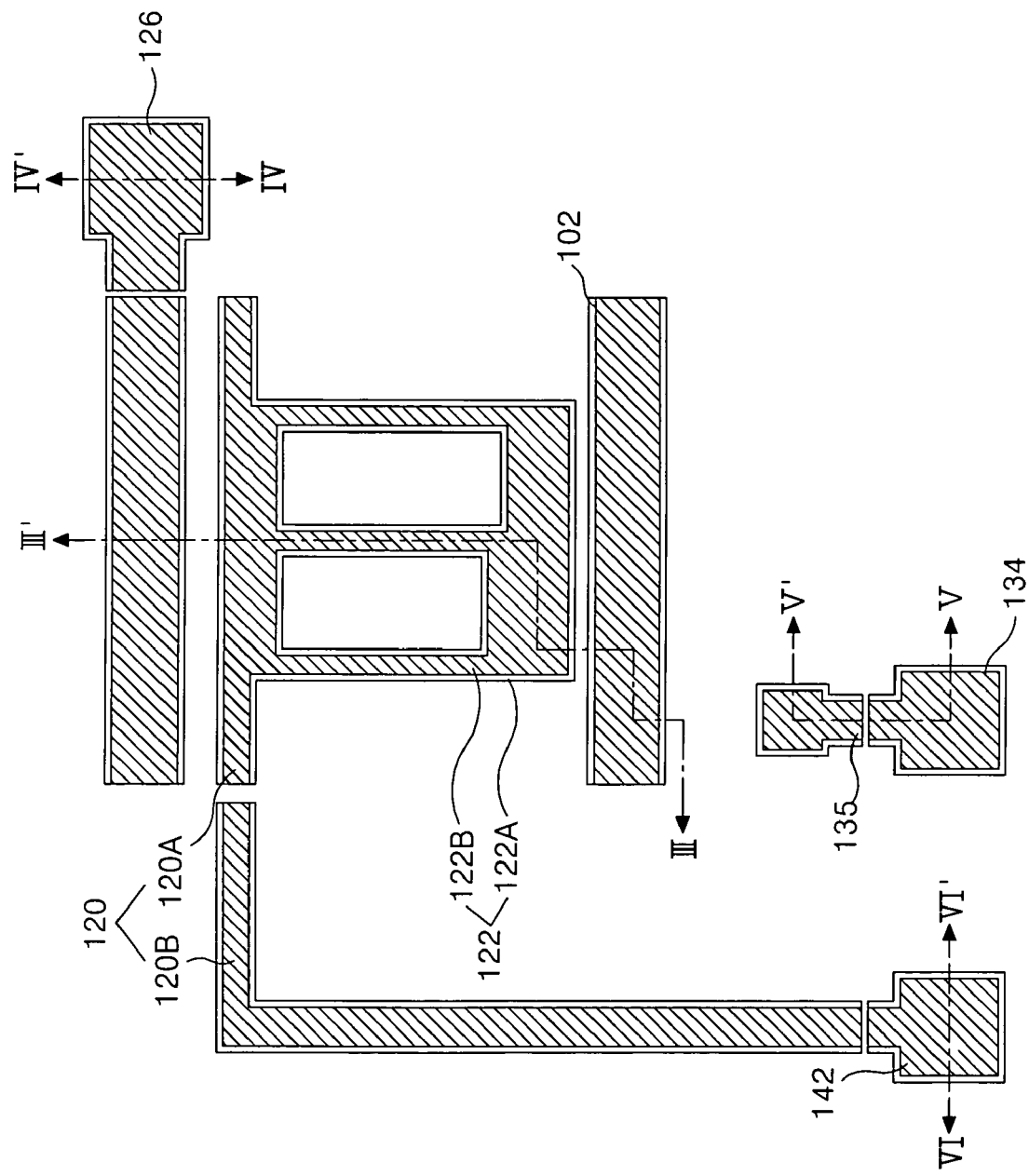
FIG. 6a and FIG. 6b are a plan view and a sectional view for explaining a first mask process in a method of fabricating the thin film transistor substrate of horizontal electric field applying type according to an embodiment of the present invention, respectively.
Figure 6B:
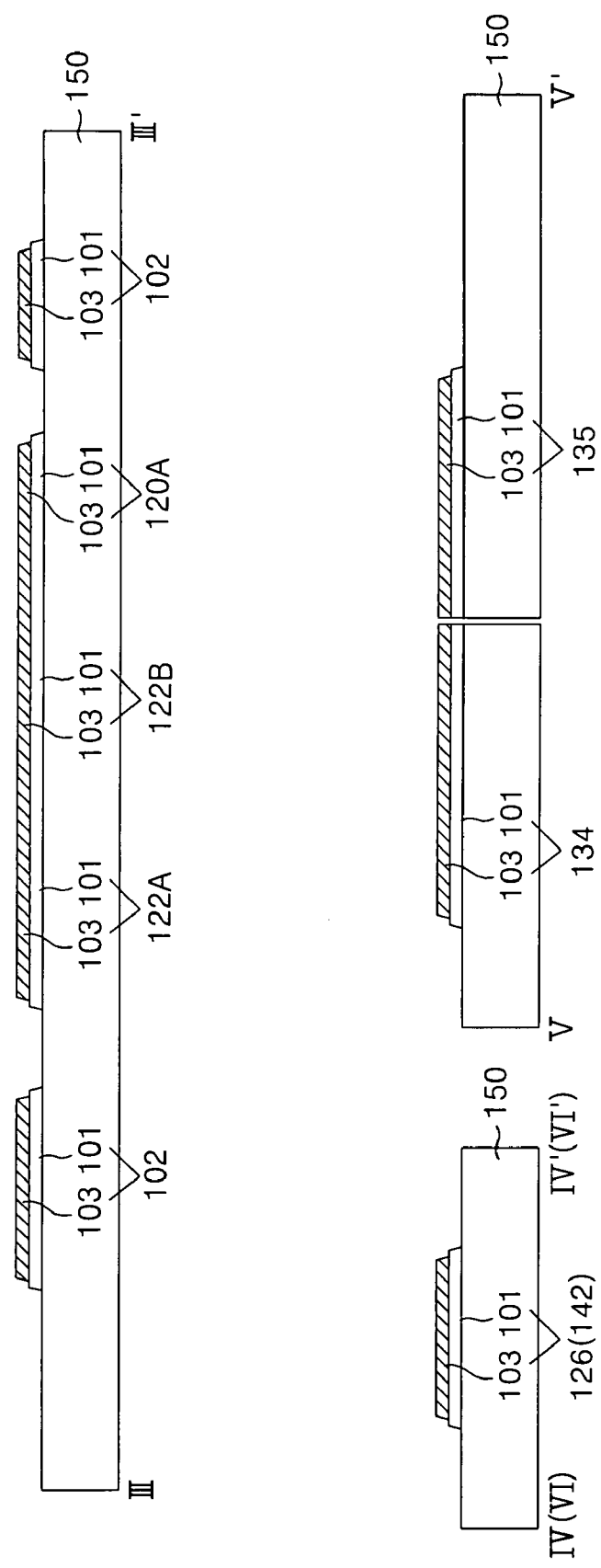

FIG. 6a and FIG. 6b are a plan view and a section view explaining a first mask process, respectively, in a method of fabricating the thin film transistor substrate of a horizontal electric field applying type according to an embodiment of the present invention.

A first mask pattern group including the gate line 102, the lower gate pad electrode 126, the common line 120, the common electrode 122, the lower common pad electrode 142, the data link 135 and the lower data pad electrode is formed on the lower substrate 150 by the first mask process. Herein, the first mask pattern group has a multiple-layer structure in which at least two conductive layers are built. But, for explanation convenience sake, there will be described only a double-layer structure having first and second conductive layers 101 and 103.

Specifically, the first and second conductive layers 101 and 103 are disposed on the lower substrate 150 by a deposition method such as sputtering. The first conductive layer 101 is formed of a transparent conductive material such as ITO, TO, IZO or ITZO, etc. On the other hand, the second conductive layer 103 employs a single layer formed of a metal material such as Mo, Ti, Cu, AlNd, Al, Cr, a Mo-alloy, a Cu-alloy or an Al-alloy, etc., or takes a layered structure of at least double layers such as Al/Cr, Al/Mo, Al(Nd)/Al, Al(Nd)/Cr, Mo/Al (Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, etc. Next, the first and second conductive layers 101 and 103 are patterned by photolithography and an etching process using the first mask, thereby providing the first mask pattern group including a double-layer structure of the gate line 102, the lower gate pad electrode 126, the common line 120, the common electrode 122, the lower common pad electrode 142, the data link 135 and the lower data pad electrode 134.

Figure 7A:
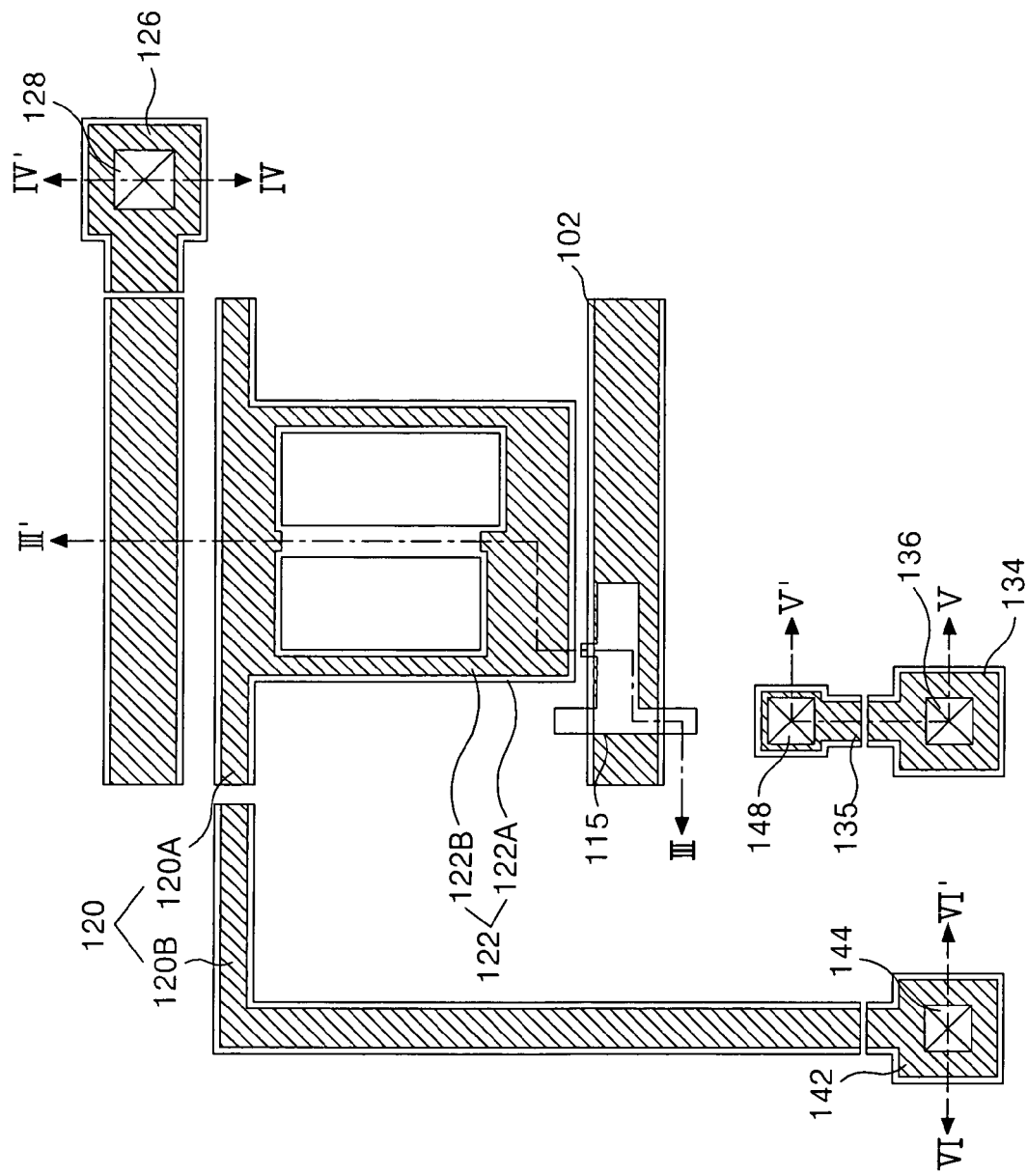

FIG. 7a and FIG. 7b are a plan view and a sectional view for explaining a second mask process in a method of fabricating the thin film transistor substrate of horizontal electric field applying type according to the embodiment of the present invention, respectively, and FIG. 8a to FIG. 8f are section views specifically explaining the second mask process.

The gate insulating film 152 including the transmitting hole 121 and first to fourth contact holes 128, 136, 144 and 148 and the semiconductor pattern 115 are formed on the lower substrate 150 provided with the first mask pattern group by the second mask process. The semiconductor pattern 115, and the transmitting hole 121 and the contact holes 128, 136, 144 and 148 of the gate insulating film 152 are defined by a single mask process employing a diffractive exposure mask or a half tone mask. Hereinafter, a case where the half tone mask is used as a second mask will be described.

Figure 8A:
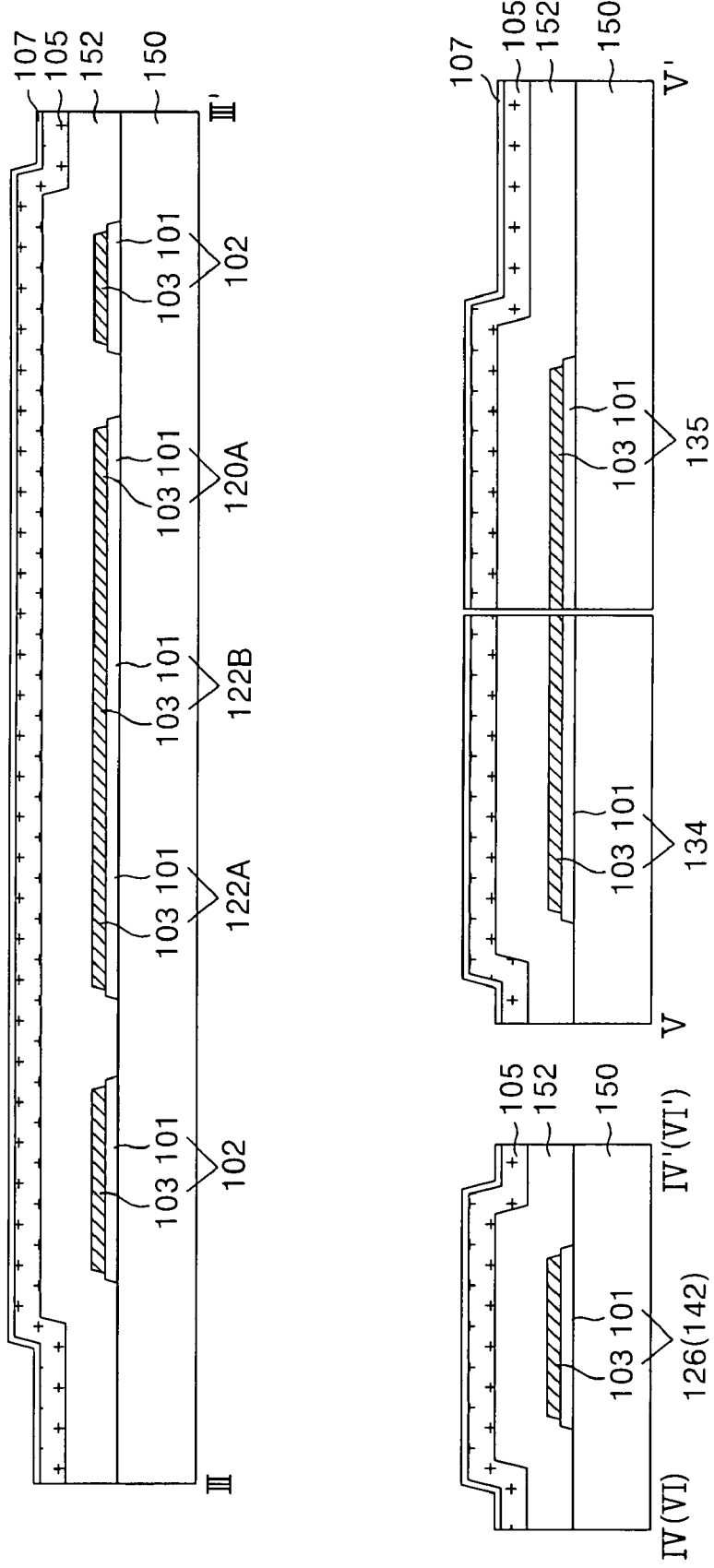

Referring to FIG. 8a, the gate insulating film 152, an amorphous silicon layer 105 and an amorphous silicon layer 107 doped with an $n^+$ or $p^+$ impurity are sequentially disposed on the lower substrate 150 provided with the first mask pattern group by a deposition technique such as the PECVD, etc. Herein, the gate insulating film 152 is formed of an inorganic insulating material such as silicon oxide ($SiO_x$) or silicon nitride ($SiN_x$).

Figure 8B:
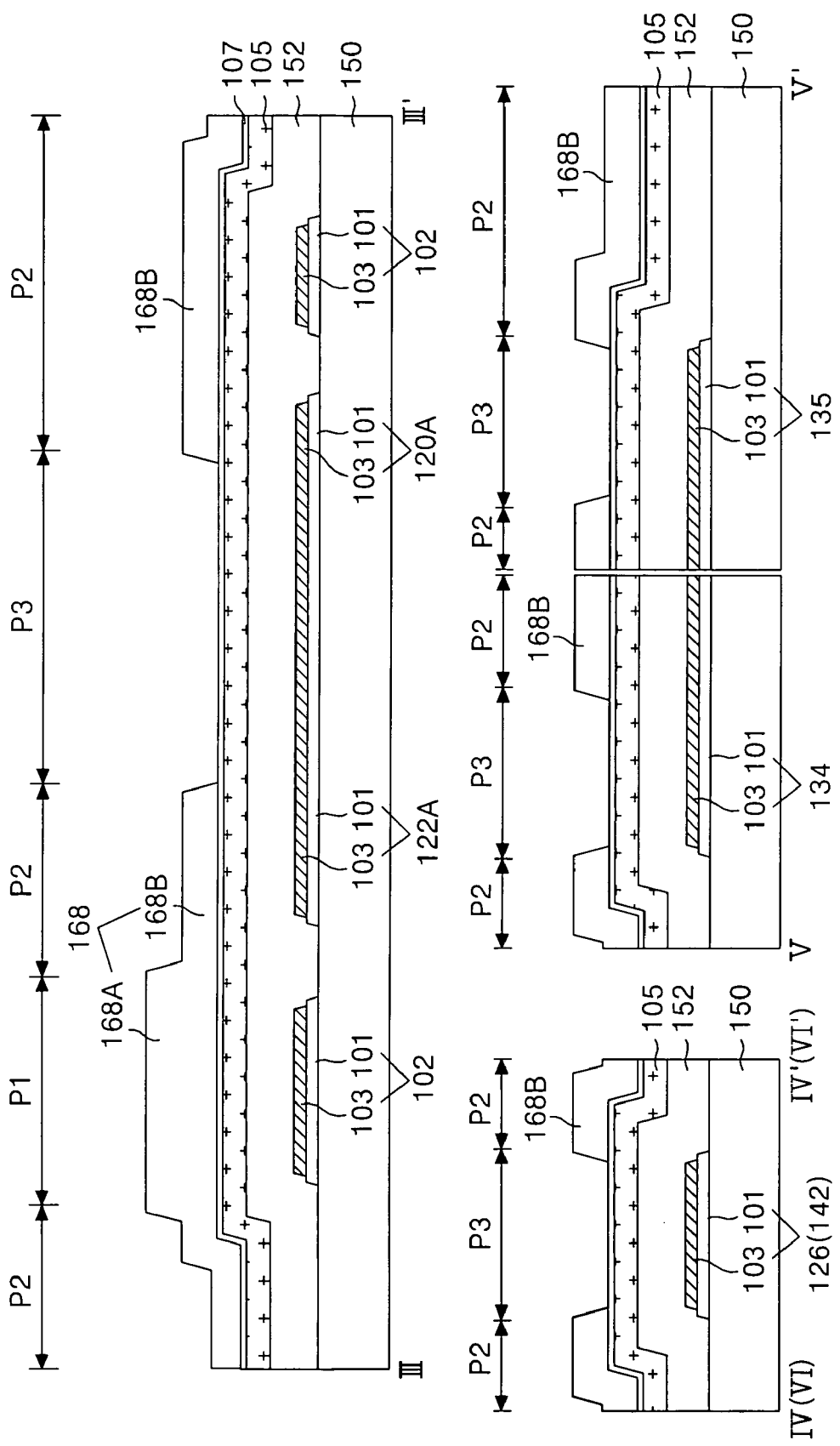

Referring to FIG. 8b, a first photo-resist pattern 168 having step coverage is formed by photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The second photo-resist pattern 168 includes a different thickness of first photo-resist patterns 168A and 168B and an aperture part is formed by photolithography using a half tone mask. In this case, the relatively thick first photo-resist pattern 168A is provided at a shielding area P1 of the second photo-resist overlapping with the shielding part of the half tone mask; the first photo-resist pattern 168B is thinner than the first photo-resist pattern 168A and is provided at a half tone exposure area P2 overlapping with the half-tone transmitting part; and the aperture part is provided at an full exposure area P3 overlapping with the full transmitting part.

Referring to FIG. 8c, the transmitting hole 121 and the first to fourth contact holes 128, 136, 144 and 148 passing through the second conductive layer 103 from the amorphous silicon layer 107 doped with an $n^+$ or $p^+$ impurity 107 are formed by the etching process using the first photo-resist pattern 168 as a mask. The transmitting hole 121 and the first to fourth contact holes 128, 136, 144 and 148 expose the first conductive layer 101 of the middle finger 122B of the common electrode 122, the lower gate pad electrode 126, the lower data pad electrode 134, the lower common pad electrode 142 and the data link 135, respectively.

In FIG. 8d, a thickness of the first photo-resist pattern 168A is thinned while the first photo-resist pattern 168B is removed by an ashing process using an oxygen ($O_2$) plasma.

In FIG. 8e, the amorphous silicon doped with an n+ or p+ impurity 107 and the amorphous silicon layer 105 are patterned by an etching process using the ashed second photo-resist pattern 168A as a mask to thereby provide the semiconductor pattern 115 including the active layer 114 and the ohmic contact layer 116.

Alternatively, a process of forming the transmitting hole 121, the first to fourth contact holes 128, 136, 144 and 148 and the semiconductor pattern 115 including the active layer 114 and the ohmic contact layer 116 using the first photo-resist pattern 168 as a mask may be replaced by a single process.

Referring to FIG. 8f, the first photo-resist pattern 168A left on the semiconductor pattern 115 in FIG. 8e is removed by a stripping process.

Figure 9A:
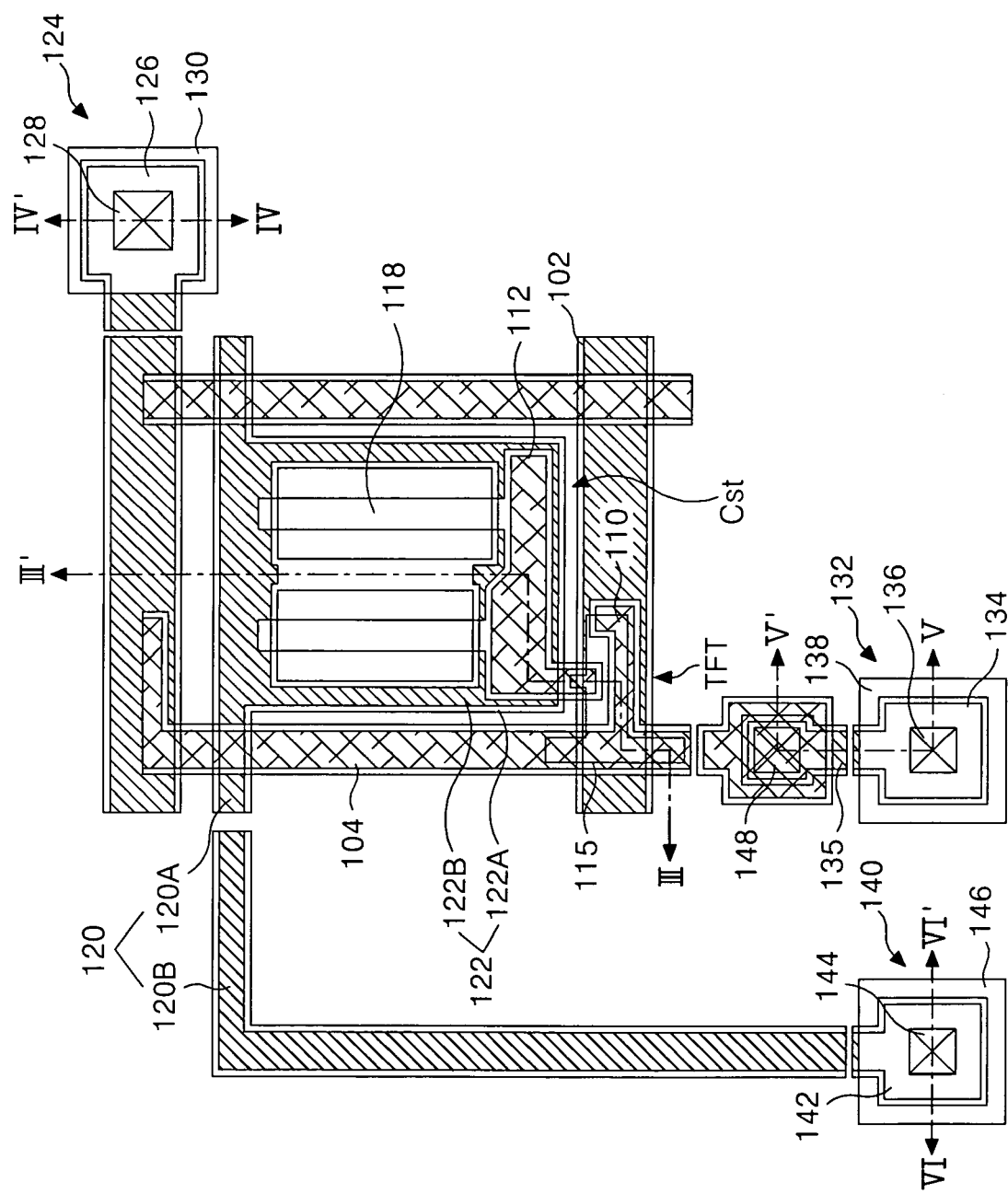

FIG. 9a and FIG. 9b are a plan view and a sectional view for explaining a third mask process in a method of fabricating the thin film transistor substrate of horizontal electric field applying type according to the embodiment of the present invention, respectively, and FIG. 10a to FIG. 10f are sectional views specifically explaining the third mask process.

A third mask pattern group including the data line 104, the source electrode 110, the drain electrode 112, the pixel electrode 118, the upper gate pad electrode 130, the upper data pad electrode 138 and the upper common pad electrode 146 is formed on the gate insulating film 152 provided with the semiconductor pattern 115 by the third mask process. Herein, a third mask pattern group A including the data line 104, the source electrode 110 and the drain electrode 112 has a multiple-layer structure in which at least two conductive layers are formed. For convenience, only a double-layer structure having the third and fourth conductive layers 111 and 113 will be described. A third mask pattern group B including the pixel electrode 118, the upper gate pad electrode 130, the upper data pad electrode 138 and the upper common pad electrode 146 has a single-layer structure formed of the third conductive layer 111 of the third mask pattern group A. The third mask pattern group including the third mask pattern group A having such a double-layer structure and the third mask pattern group B having such a single-layer structure is formed by the third mask process using a diffractive exposure mask or a half tone mask. Hereinafter, a case where the half tone mask is used as a third mask will be described.

Referring to FIG. 10a, the third and fourth conductive layers 111 and 113 are sequentially formed on the gate insulating film 152 provided with the semiconductor pattern 115 by a deposition method such as sputtering. The third conductive layer 111 is formed of a transparent conductive material such as ITO, TO, IZO or ITZO, etc, or an opaque metal having a strong corrosion resistance and a high strength such as Ti or W, etc. The fourth conductive layer 113 employs a single layer formed of a metal material such as Mo, Ti, Cu, AlNd, Al, Cr, a Mo-alloy, a Cu-alloy or an Al-alloy, etc., or takes a layer built structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, etc.

Referring to FIG. 10b, a third photo-resist pattern 182 having step coverage is formed by photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The third photo-resist pattern 182 includes a different thickness of third photo-resist patterns 182A and 182B and an aperture part is formed by the photolithography using a half tone mask. In this case, the relatively thick third photo-resist pattern 182A is provided at a shielding area P1 of the third photo-resist overlapping with the shielding part of the half tone mask; the third photo-resist pattern 182B is thinner than the third photo-resist pattern 182A and is provided at a half tone exposure area P2 overlapping with the half-tone transmitting part; and the aperture part is provided at an full exposure area P3 overlapping with the full transmitting part.

Figure 10C:
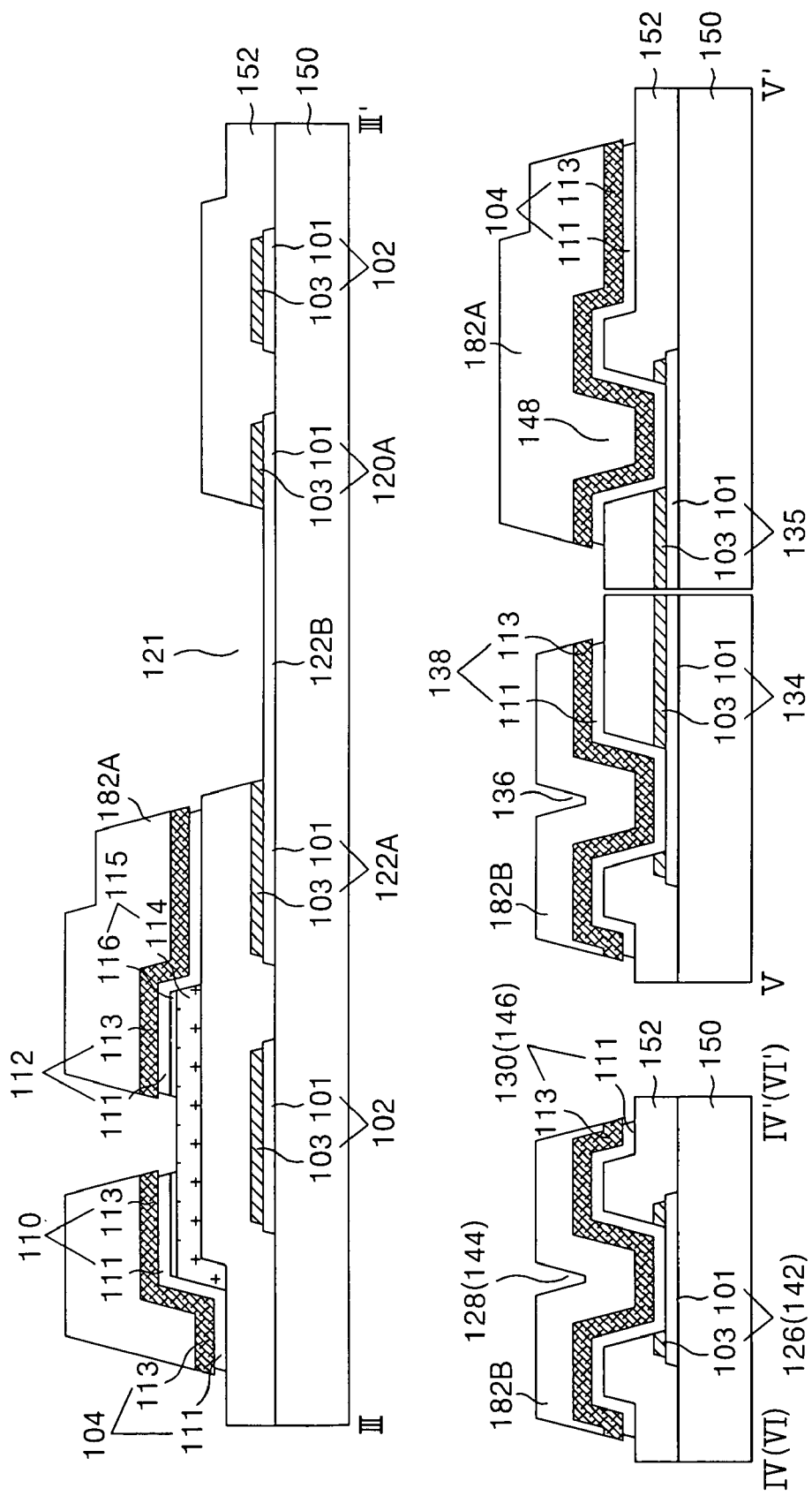

Referring to FIG. 10c, the third and fourth conductive layers 111 and 113 are patterned by a wet-etching process using the third photo-resist pattern 182 as a mask to thereby provide a double-layer structure of the data line 104, the source electrode 110, the drain electrode 112, the pixel electrode 118, the upper gate pad electrode 130, the upper data pad electrode 138 and the upper common pad electrode 146. The data line 104 is overlapped with the data link 135 and is connected, via the fourth contact hole 148, to the data link 135. In this case, since the fourth conductive layer 113 is etched and then the third conductive layer 111 is etched by a different etchant, the third conductive layer 111 positioned at a lower portion than the upper fourth conductive layer 113 is over-etched to cause an under-cut area. Further, the ohmic contact layer 116 between the source electrode 110 and the drain electrode 112 is removed by the etching process using the source electrode 110 and the drain electrode 112 as a mask, for example, the dry-etching process, to thereby expose the active layer 114. In this case, the edge of the separated ohmic contact layer 116 has a more protruded shape than the third conductive layer 111 edges of the source electrode 110 and the drain electrode 112.

Referring to FIG. 10d, a thickness of the third photo-resist pattern 182A is thinned and the third photo-resist pattern 182B is removed by an ashing process. Such a removal of the third photo-resist pattern 182B exposes the fourth conductive layer 113 of the pixel electrode 118, the upper gate pad electrode 130, the upper data pad electrode 138 and the upper common pad electrode 146. Further, the edge of the ashed third photo-resist pattern 182A is positioned at the inner side of the edge of the patterned fourth conductive layer 113.

Figure 10E:
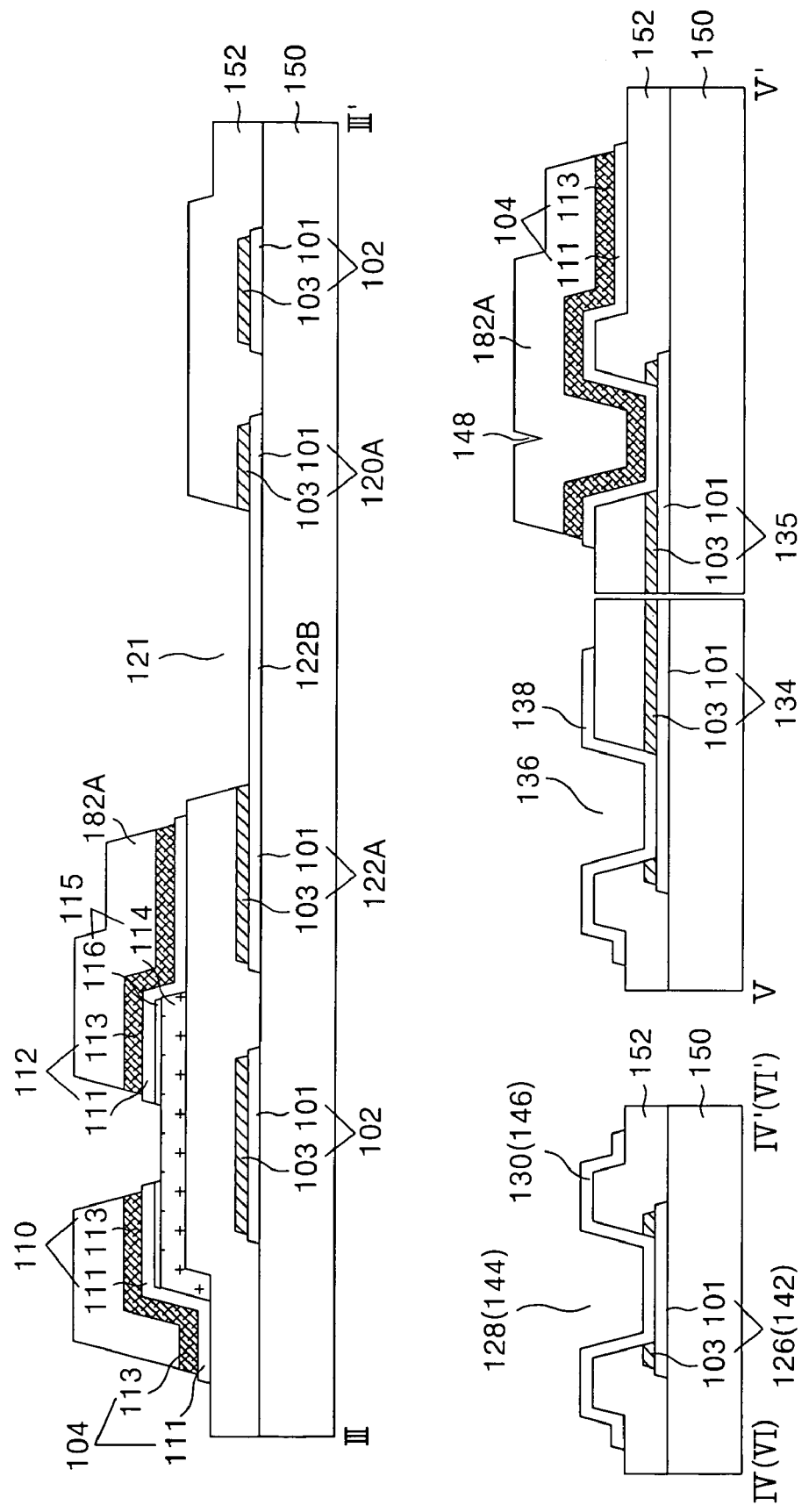

Referring to FIG. 10e, the fourth conductive layer 113 of the pixel electrode 118, the upper gate pad electrode 130, the upper data pad electrode 138 and the upper common pad electrode 146 are etched by an etching process using the ashed third photo-resist pattern 182A as a mask to thereby provide the pixel electrode 118, the upper gate pad electrode 130, the upper data pad electrode 138 and the upper common pad electrode 146 that have a single-layer structure of the third conductive layer 111. In this case, each side of the fourth conductive layer 113 exposed through the edge of the third photo-resist pattern 182A is again etched. Thus, the third and fourth conductive layers 111 and 113 of the data line 104, the source electrode 110 and the drain electrode 112 have a constant step coverage taking a stepwise shape. Further, the edge of the ohmic contact layer 116 at the channel portion of the thin film transistor TFT may be more protruded than those of the source electrode 110 and the drain electrode 112 to thereby provide the ohmic contact layer 116 and the third and fourth conductive layers 111 and 113 with step coverage taking a stepwise shape.

Referring to FIG. 10f, the third photo-resist pattern 168A in FIG. 10e is removed by a stripping process.

As a result, the thin film transistor substrate of horizontal electric field applying type according to the embodiment of the present invention has an exposed structure of the data line 104, the source electrode 110, and the pixel electrode 118 due to an absence of a protective film. However, all of them are positioned at an area sealed by the sealant, so that they may be sufficiently protected by the lower alignment film formed thereon as well as by the liquid crystal formed in the sealed area.

Figure 11:
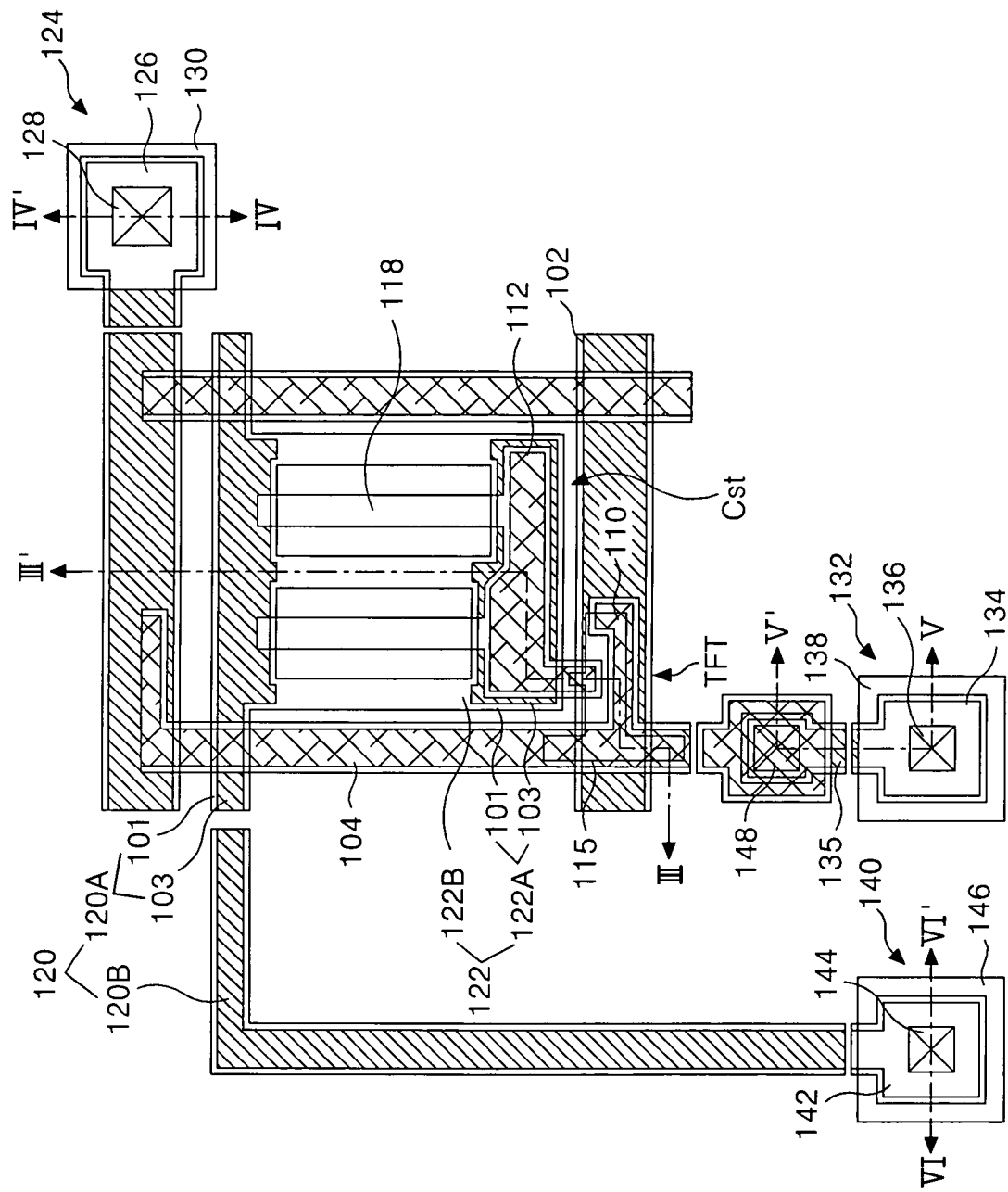
FIG. 11 is a plan view showing a portion of a thin film transistor substrate of horizontal electric field applying type according to another embodiment of the present invention.

FIG. 11 is a plan view showing a portion of a thin film transistor substrate of horizontal electric field applying type according to another embodiment of the present invention.

The thin film transistor substrate shown in FIG. 11 has the same elements as the thin film transistor substrate shown in FIG. 2 except that the fingers 122B of the common electrode 122 are formed only from a transparent conductive layer so that all of them can contribute to an aperture ratio. Therefore, an explanation as to the same elements will be omitted.

The finger part 122B of the common electrode 122 in FIG. 11 is formed of a transparent conductive layer. In other words, the finger part 122B of the common electrode 122 takes such a structure that the first conductive layer is extended from the common line 120 having a structure in which the first and second conductive layers 101 and 103 are built. As mentioned above, the finger part 122B of the common electrode 122 has a structure in which the first and second conductive layers 101 and 103 are built in similarity to the common line 120 and the horizontal part 122A of the common electrode 122 in the first mask process. Next, after the gate insulating film was formed, the transmitting hole passing through an area extended from the gate insulating film until the second conductive layer 103 is formed by the second mask process. Thus, the finger part 122B of the common electrode 122 has a structure that is formed only of the first conductive layer 101, that is, a transparent conductive layer. Accordingly, the finger part 122B of the common electrode 122 may improve an aperture ratio.

Figure 12:
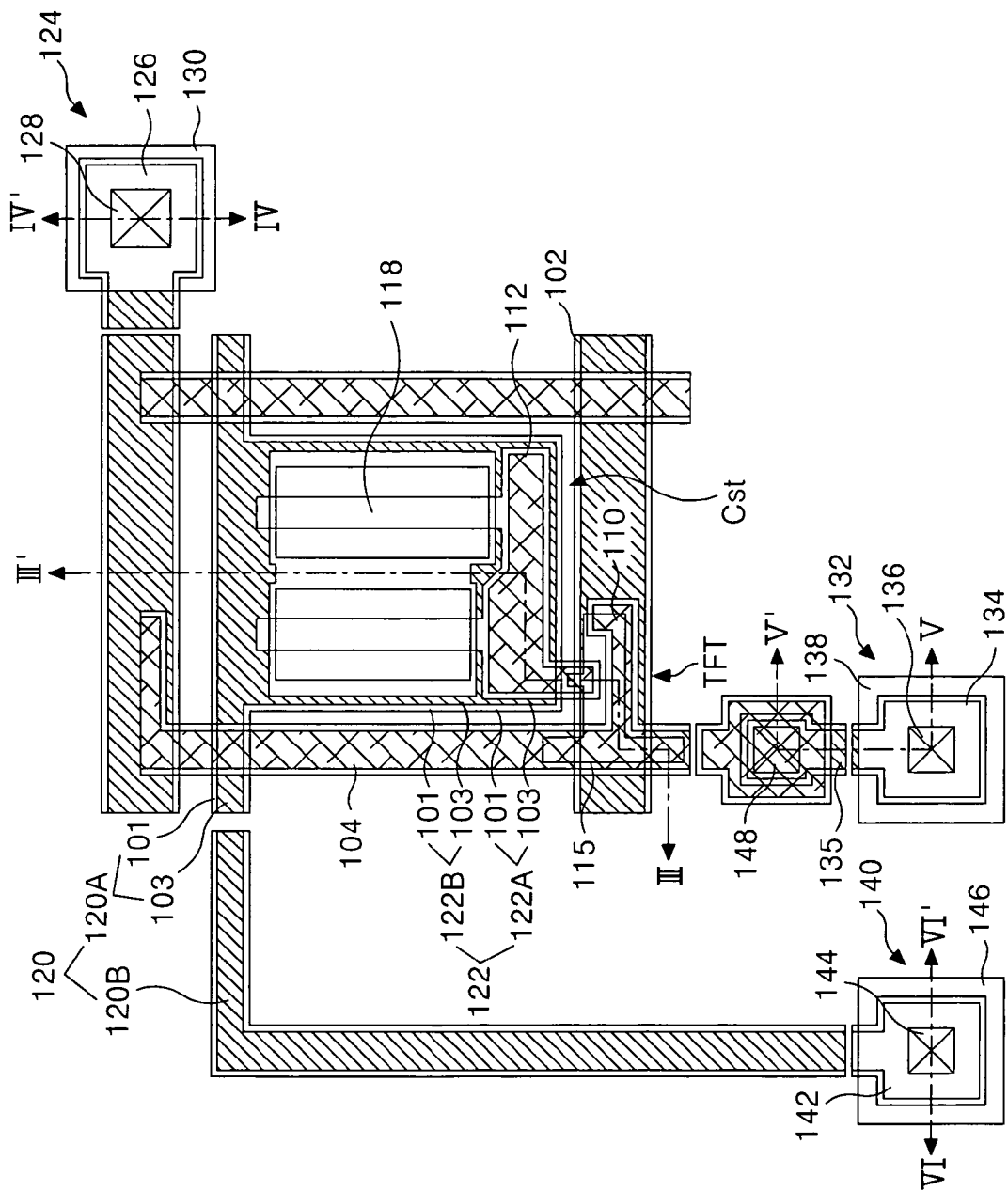
FIG. 12 is a plan view showing a portion of a thin film transistor substrate of horizontal electric field applying type according to another embodiment of the present invention.

FIG. 12 is a plan view showing a portion of a thin film transistor substrate of horizontal electric field applying type according to another embodiment of the present invention.

The thin film transistor substrate shown in FIG. 12 has the same elements as the thin film transistor substrate shown in FIG. 2 except that the first conductive layer 101 has a partially exposed structure so that the finger part 122B adjacent to the data line 104 of the common electrode 122 may contribute to an aperture ratio. Therefore, an explanation as to the same elements will be omitted.

Referring to FIG. 12, the finger part 122B adjacent to the data line 104 of the common electrode 122 has a structure in which the first and second conductive layers 101 and 103 are built, and one side thereof adjacent to the pixel electrode 118 has a structure in which the first conductive layer 101 is exposed. Accordingly, a portion in which the first and second conductive layers 101 and 103 are built, of the finger part 122A of the common electrode 122, may prevent a light leakage while, and a portion thereof in which the first conductive layer is exposed can contribute to an aperture ratio. As mentioned above, the finger part 122B of the common electrode 122 has a structure in which the first and second conductive layers 101 and 103 are formed similar to the common line 120 and the horizontal part 122A of the common electrode 122 in the first mask process. Next, after the gate insulating film was formed, a transmitting hole passing through an area extended from the gate insulating film until the second conductive layer 103 is defined at a portion of the finger part 122B of the common electrode 122 adjacent to the data line 104 by the second mask process. Thus, the first conductive layer 101 has an exposed structure.

As described above, in the thin film transistor substrate of horizontal electric field applying type and a fabricating method thereof according to the present invention, the semiconductor pattern, the transmitting hole and a plurality of the contact holes are formed with the aid of the first half tone (or a diffractive exposure) mask.

Furthermore, in the thin film transistor substrate of horizontal electric field applying type and the fabricating method thereof according to the present invention, a single-layer structure of a pixel electrode and upper pad electrodes are formed, along with a multiple-layer structure of other third mask pattern group, with the aid of the second half tone (or a diffractive exposure) mask without the protective film.

Accordingly, the entire process may be simplified by the three-round mask process, so that it becomes possible to reduce the material cost and the equipment investment cost, etc. as well as to improve the productivity.

Furthermore, according to the present invention, the pixel electrode is formed of a transparent conductive layer and a portion of the common electrode contributing to an aperture ratio is formed of a transparent conductive layer, so that it becomes possible to improve an aperture ratio.

Moreover, the liquid crystal panel employing the thin film transistor substrate of horizontal electric field applying type according to the present invention allows the data line, the source electrode, the drain electrode and the pixel electrode exposed due to an absence of the protective film in the tin film transistor substrate to be sufficiently protected by the lower alignment film formed thereon or by the liquid crystal filled in the area sealed by the sealant. Also, it permits all the pads of the thin film transistor substrate to have the same structure, and permits the data link connected to the data pad to be connected, via the contact hole, to the data line within an area sealed by the sealant. Thus, it becomes possible to prevent an illumination problem, etc. caused by an absence of the protective film.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
a first mask process of forming a first mask pattern group including a gate line, a gate electrode connected to the gate line and a common line parallel to the gate line having a first conductive layer group structure including at least double conductive layers, and a common electrode extended from the common line, on a substrate;
a second mask process of forming a gate insulating film on the first mask pattern group, forming a semiconductor pattern on the gate insulating film, and exposing a portion of the common electrode, so that the common electrode at that portion consists of one conductive layer of the first conductive layer group; and
a third mask process of forming a third mask pattern group including a data line, a source electrode connected to the data line and a drain electrode opposite the source electrode that have a second conductive layer group structure including at least double conductive layers, and a pixel electrode having a single layer structure formed by an extension of a lowermost layer of the drain electrode, on the gate insulating film provided with the semiconductor pattern;
wherein the first mask process includes forming a lower pad electrode connected to one of the gate line, the data line and the common line from the first conductive layer group, wherein the second mask process includes forming a contact hole passing through the gate insulating film to expose the lower pad electrode, and wherein the third mask process includes forming an upper pad electrode connected, via the contact hole, to the lower pad electrode from the lowermost layer of the second conductive layer group.

2. The method as claimed in claim 1, wherein the third mask pattern group is positioned in an area to be sealed by a sealant upon joining the substrate and another substrate.

3. The method as claimed in claim 1, wherein the first mask process includes forming a data link provided such that the first conductive layer group is extended from the lower pad electrode overlapped with the data line, and the second mask process includes forming a second contact hole for connecting the data link with the data line.

4. The method as claimed in claim 3, wherein the second contact hole is positioned in an area to be sealed by a sealant upon joining the substrate and another substrate.

5. The method as claimed in claim 3, further comprising forming an alignment film on the third mask pattern group.

6. The method as claimed in claim 5, wherein the second contact hole is positioned under the alignment film.

7. The method as claimed in claim 3, wherein the contact hole passes through an area extended from an upper layer of the first conductive layer group to expose the lowermost layer of the first conductive layer group, and a portion of the common electrode exposes the lowermost layer of the first conductive layer group through a transmitting hole passing through the gate insulating film and an upper layer of the first conductive layer group.

8. The method as claimed in claim 7, wherein the second mask process further includes:
forming a gate insulating film on the first mask pattern group, an amorphous silicon layer, an amorphous silicon layer doped with an impurity;
forming photo-resist patterns having a different thicknesses by photolithography using one of a half tone mask and a diffractive exposure mask; and
forming the transmitting hole, the contact hole and the semiconductor pattern having the active layer and the ohmic contact layer by an etching process using the photo-resist patterns.

9. The method as claimed in claim 8, wherein the third mask process further includes:
forming the second conductive layer group on the gate insulating film provided with the semiconductor pattern;
forming second photo-resist patterns having different thicknesses using one of a half tone mask and a diffractive exposure mask;
forming a third mask pattern group having the upper pad electrode by patterning the second conductive layer group by an etching process using the second photo-resist patterns;
removing the ohmic contact layer exposed between the source electrode and the drain electrode; and
etching the upper pad electrode to remove all of an upper layer of the upper pad electrode and to remain all of the lowermost layers thereof by an etching process using the second photo-resist pattern.

10. The method as claimed in claim 9, wherein lowermost layers of the first and second conductive layer groups include one of a transparent conductive layer, Ti and W.

11. The method as claimed in claim 1, wherein a portion of the common electrode has a structure in which the lowermost layer of the first conductive layer group is exposed, and the pixel electrode has a structure that is extended from the lowermost layer of the drain electrode.

12. The method as claimed in claim 11, wherein lowermost layers of the first and second conductive layer groups include one of a transparent conductive layer, Ti and W.

13. The method as claimed in claim 11, further comprising:
if when the lowermost layer of the second conductive layer group is over-etched in comparison to the upper layer thereof when the second conductive group is patterned, etching each side of the upper layer exposed through the second photo-resist patterns to locate an edge of the upper layer at an inner side than that of the lowermost layer; and
if when the lowermost layer of the second conductive layer group is not over-etched in comparison to the upper layer thereof when the second conductive group is patterned, a condition of etching each side of the upper layer exposed through the second photo-resist patterns is not in force.

14. The method as claimed in claim 11, wherein the ohmic contact layer formed of the active layer with a channel and the edges of the source electrode and the drain electrode have step coverage taking a stepwise shape.

15. The method as claimed in claim 1, further comprising:
forming a storage capacitor by overlapping the drain electrode with a portion of the common electrode with the gate insulating film.

16. The method as claimed in claim 1, wherein at least one of the first and second conductive groups has step coverage taking a stepwise shape.

* * * * *